(12) United States Patent
Buskila et al.

(10) Patent No.: US 8,765,840 B2
(45) Date of Patent: *Jul. 1, 2014

(54) ARTIFICIAL MARBLE, AND SYSTEM AND METHOD OF PRODUCING ARTIFICIAL MARBLE

(71) Applicants: Liat Eliahu Buskila, Sdot-Yam (IL); Yaakov Gal, Sdot-Yam (IL); Eran Pinchas Goldberg, Nesher (IL); Ruti Harel, Sdot-Yam (IL); Yaacov Ron, Ahuzat Barak (IL); Alon Golan, Nesher (IL)

(72) Inventors: Liat Eliahu Buskila, Sdot-Yam (IL); Yaakov Gal, Sdot-Yam (IL); Eran Pinchas Goldberg, Nesher (IL); Ruti Harel, Sdot-Yam (IL); Yaacov Ron, Ahuzat Barak (IL); Alon Golan, Nesher (IL)

(73) Assignee: Caesarstone Sdot-Yam Ltd., Kibbutz Sdot-Yam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,393

(22) Filed: May 6, 2013

(65) Prior Publication Data
US 2013/0245156 A1    Sep. 19, 2013

Related U.S. Application Data

(63) Continuation of application No. 12/923,399, filed on Sep. 20, 2010, now Pat. No. 8,436,074, which is a continuation-in-part of application No. 12/232,844, filed on Sep. 25, 2008, now Pat. No. 8,026,298.

(60) Provisional application No. 61/272,432, filed on Sep. 24, 2009, provisional application No. 60/960,322, filed on Sep. 25, 2007.

(51) Int. Cl.
C09D 5/29    (2006.01)

(52) U.S. Cl.
USPC ........................................... 523/171

(58) Field of Classification Search
USPC ........................................... 523/171
See application file for complete search history.

(56) References Cited

U.S. PATENT DOCUMENTS

| | | | |
|---|---|---|---|
| 4,493,875 A | 1/1985 | Beck et al. | |
| 4,678,819 A | 7/1987 | Sasaki et al. | |
| 6,127,458 A | 10/2000 | Sakai | |
| 6,432,329 B1 | 8/2002 | Cohen | |
| 6,511,750 B1 | 1/2003 | Yanagase et al. | |
| 6,517,915 B1 | 2/2003 | Banus | |
| 8,026,298 B2 * | 9/2011 | Buskila et al. | 523/171 |
| 8,436,074 B2 * | 5/2013 | Buskila et al. | 523/171 |
| 8,436,075 B2 | 5/2013 | Buskila et al. | |

FOREIGN PATENT DOCUMENTS

| | | |
|---|---|---|
| BE | 365505 | 12/1929 |
| BE | 565536 | 3/1958 |
| CN | 1167477 | 12/1997 |
| EP | 0711935 A1 | 5/1996 |
| EP | 0771935 A1 | 5/1997 |
| EP | 0790222 A1 | 8/1997 |
| EP | 0771935 B1 | 8/2001 |
| EP | 1251113 | 10/2002 |
| GB | 2025832 | 1/1980 |
| JP | 05058698 | 3/1993 |
| WO | 9918046 | 4/1999 |
| WO | 0005302 | 2/2000 |
| WO | 2006084792 | 8/2006 |

OTHER PUBLICATIONS

International Search Report for PCT/IB2008/053902 dated Mar. 13, 2009.
Machine Translation of JP-05058698, generated online at the Japanese patent office website on May 10, 2013.
European Search Report for corresponding EP application 10010147.6 mailed on Nov. 19, 2013.

* cited by examiner

*Primary Examiner* — Edward Cain
(74) *Attorney, Agent, or Firm* — Eitan, Mehulal & Sadot

(57) ABSTRACT

An artificial stone slab comprises a plurality of coated lumps of composite stone material, wherein at least a first set of the plurality of coated lumps are substantially in contact with one another, and wherein at least a second set of the plurality of coated lumps are spaced apart by one or more fillers. An engineered stone slab comprises a plurality of coated lumps of composite stone material, wherein at least a portion of the coated lumps comprise an inner core having a first color and an outer layer having a second, different, color.

19 Claims, 32 Drawing Sheets

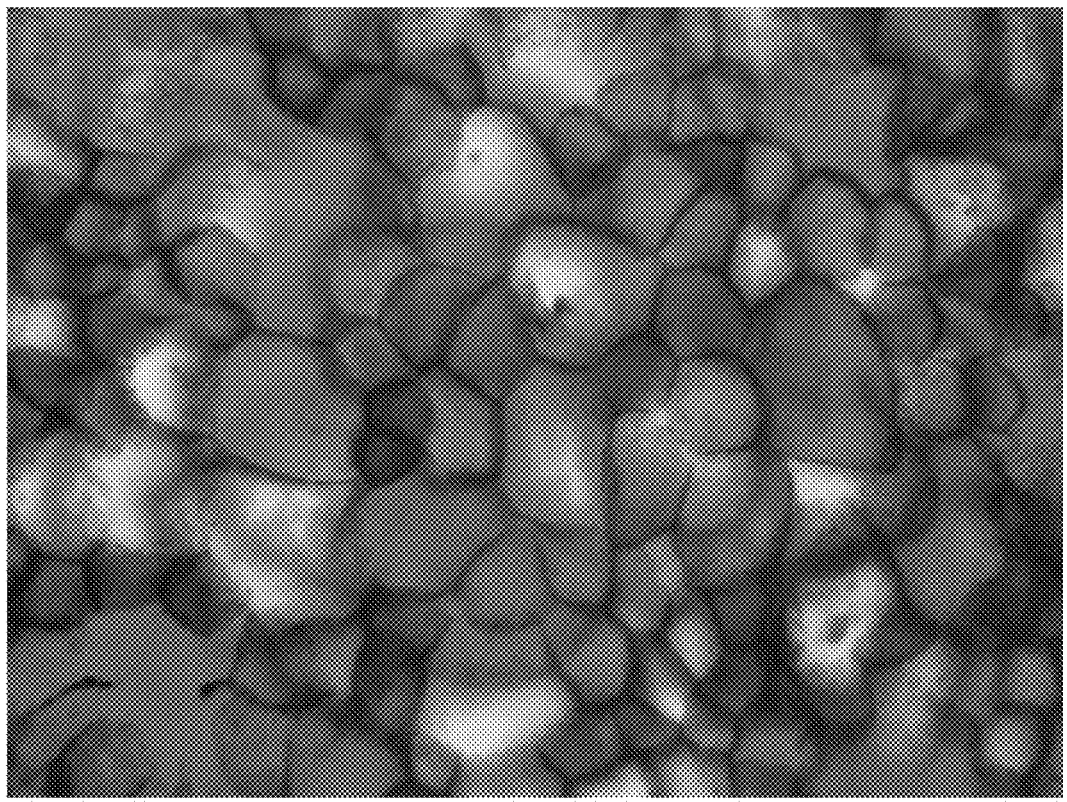
FIG. 5-O

ARTIFICIAL MARBLE, AND SYSTEM AND METHOD OF PRODUCING ARTIFICIAL MARBLE

CROSS-REFERENCE TO RELATED APPLICATIONS

This patent application is a continuation of, and claims priority and benefit from, U.S. patent application Ser. No. 12/923,399, filed on Sep. 20, 2010, titled "Artificial Marble, and System and Method of Producing Artificial Marble", which is hereby incorporated by reference in its entirety. U.S. patent application Ser. No. 12/923,399 claims priority and benefit from U.S. Provisional Patent Application No. 61/272,432, titled "Artificial Marble, and System and Method of Producing Artificial Marble", filed on Sep. 24, 2009, which is hereby incorporate by reference in its entirety. U.S. patent application Ser. No. 12/923,399 further claims priority and benefit from, and is a Continuation-In-Part (CIP) of, U.S. patent application Ser. No. 12/232,844, titled "Artificial Marble and Methods", filed on Sep. 25, 2008, which is incorporated herein by reference in its entirety; and which, in turn, claims priority and benefit from U.S. Provisional Patent Application No. 60/960,322, titled "Artificial Marble and Methods", filed on Sep. 25, 2007, which is incorporated herein by reference in its entirety.

FIELD

Some embodiments are related to the field of artificial marble.

BACKGROUND

Quartz is a common oxide; it is the crystalline form of silicon dioxide (SiO2), and is considered one of the hardest materials in nature. Quartz may be used, for example, for production of various stone materials. Quartz-containing stone materials may be used, for example, in the preparation of slabs, surfaces, or the like. Quartz-containing stone material may be used for various purposes, for example: interior wall cladding, fireplace mantles and surroundings, wainscots and wall bases, bank teller lines, tables and desktops, elevator cab walls and floors, floor tile and stair treads, food service areas, shower and tub surrounds, toilet compartment partitions, window seats, countertops and backsplashes, or the like.

As compared to other natural stone compositions, such as granite and marble, quartz-containing stone material may be stronger and more durable than natural stone compositions. In addition, quartz-containing stone material may be cleaner, safer and more consistent than other stone surfaces. Furthermore, quartz-containing stone materials may be, for example, more resistant to breakage, scratching, stain, heat, chemicals, freeze-thaw damage, or the like.

The production of quartz-containing stone material may include, for example, mixing of inorganic quartz matrix and organic polymers that may be bound by linker compounds. The binding between the inorganic quartz matrix and the organic polymers may influence the resistance of the final composition of the quartz-containing stone material.

SUMMARY

Some embodiments include, for example, artificial marble, as well as systems and methods for producing artificial marble.

In some embodiments, a method of producing a stone slab comprises: placing into a frame a plurality of coated lumps of composite stone material; removing substantially all air among the plurality of lumps; pressing the content of said frame; and curing the content of said frame to form the stone slab.

In some embodiments, the placing comprises: placing the plurality of coated lumps into the frame in accordance with a position in which the plurality of coated lumps are substantially in contact with one another.

In some embodiments, the method comprises: prior to placing the plurality of coated lumps, producing the plurality of coated lumps.

In some embodiments, the producing comprises: scooping a first inorganic particulate material and a polymer material to produce lumps of composite stone material; and mixing a second inorganic particulate material with the lumps to produce coated lumps.

In some embodiments, the method comprises: during the mixing, automatically selecting coated lumps that are greater than a threshold size.

In some embodiments, the method comprises: during the mixing, automatically ejecting from a mixer the selected coated lumps that are greater than the threshold size.

In some embodiments, the method comprises: substantially continuously feeding lump-forming materials into the mixer; and substantially continuously ejecting from the mixer formed coated lumps that are greater than the threshold size.

In some embodiments, at least one of the plurality of coated lumps comprises a dusted lump.

In some embodiments, at least one of the plurality of coated lumps comprises an inner core and an outer layer, wherein a property of the inner core has a first value, and wherein the same property of the outer layer has a second, different, value.

In some embodiments, the property comprises a property selected from the group consisting of: color, texture, density, chemical composition, hardness, opacity, transparency, and porousivity.

In some embodiments, at least 95 percent of the formed stone slab comprises coated lumps.

In some embodiments, at least 90 percent of the formed stone slab comprises dusted lumps.

In some embodiments, the method comprises: cutting the stone slab; and polishing the stone slab.

In some embodiments, the at least one of the first inorganic particulate material and the second inorganic particulate material comprises quartz.

In some embodiments, the producing further comprises: adding one or more colorants to at least one of the first inorganic particulate material and the second inorganic particulate material.

In some embodiments, the producing further comprises: mixing a third inorganic particulate material with the coated lumps to produce multi-layer coated lumps.

In some embodiments, an artificial stone slab comprises: a plurality of coated lumps of composite stone material which are substantially in contact with one another.

In some embodiments, the plurality of coated lumps are substantially gap-free.

In some embodiments, the stone slab comprises substantially exclusively said plurality of coated lumps.

In some embodiments, at least 99 percent of the stone slab comprises said plurality of coated lumps.

In some embodiments, at least 97 percent of the stone slab comprises said plurality of coated lumps.

In some embodiments, at least 95 percent of the stone slab comprises said plurality of coated lumps.

In some embodiments, substantially each of the plurality of coated lumps is in direct contact with at least one other coated lump of the plurality of coated lumps.

In some embodiments, at least one of the coated lumps is greater than a threshold value.

In some embodiments, at least one of the plurality of coated lumps comprises a dusted lump.

In some embodiments, at least one of the plurality of coated lumps comprises an inner core and an outer layer, wherein a property of the inner core has a first value, and wherein the same property of the outer layer has a second, different, value.

In some embodiments, the property comprises a property selected from the group consisting of: color, texture, density, chemical composition, hardness, opacity, transparency, and porousivity.

In some embodiments, one or more of the plurality of coated lumps comprises: a lump in which a first inorganic particulate material and a polymer material are scooped into a composite stone material which is mixed with a second inorganic particulate material.

In some embodiments, the at least one of the first inorganic particulate material and the second inorganic particulate material comprises quartz.

In some embodiments, at least one of the first inorganic particulate material and the second inorganic particulate material further comprises one or more colorants added thereto.

In some embodiments, the stone slab comprises substantially uniformly distributed coated lumps.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1A:
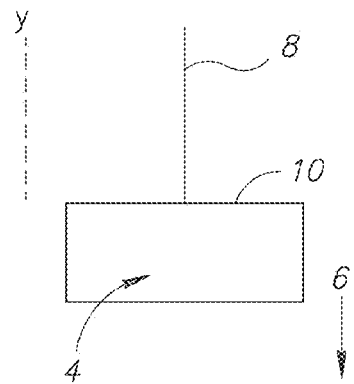
FIGS. 1A-1F are schematic illustrations of modified mixing blades, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with one or more embodiments which are described in U.S. patent application Ser. No. 12/232,844, titled "Artificial Marble Methods", filed on Sep. 25, 2008, published on Apr. 23, 2009 as United States Patent Application Publication Number 2009/0105391, which is incorporated herein by reference in its entirety; and which, in turn, claims priority and benefit from U.S. Provisional Patent Application No. 60/960,322, titled "Artificial Marble and Methods", filed on Sep. 25, 2007, which is also incorporated herein by reference in its entirety.

A composite stone material, such as, for example, artificial marble, engineered stone, quartz surfaces, composite stone, or the like, may be composed of various materials. For example, a composite stone material may be composed mainly of organic polymer(s) and inorganic particulate component. The inorganic particulate component may include components such as, for example, silicon, basalt, glass, diamond, rocks, pebbles, shells, a variety of quartz-containing materials, such as, for example, but not limited to: crushed quartz, sand, quartz particles, or the like, or any suitable combination thereof. For example, the inorganic quartz material may include sand of various particle sizes and of different combinations.

Linkage between the organic and inorganic compounds may be carried out and/or facilitated by using binder molecules, such as, for example, mono-functional or multifunctional silane molecules, dendrimeric molecules, and the like, that may have the ability to bind the organic and inorganic components of the composite stone. The binders may further include a mixture of various components, such as, for example, initiators, hardeners, catalysators, binding molecules and bridges, or any suitable combination thereof.

The manufacturing process of the composite stone material may include, for example, blending of raw material (such as, for example, inorganic quartz and organic polymers, unsaturated polymers, and the like, such as polyester) at various ratios. For example, the composite stone material may include about 85-95% natural quartz aggregates to about 5-15% polymer resins. For example, the composite stone material may include about 93% natural quartz aggregates and about 7% polymer resins. Other suitable values, ratios, or percentage values may be used.

Optionally, suitable amounts of various one or more additives may be added to blending of raw materials, at various stages of production. For example, such additives may include colorants, dyes, pigments, chemical reagents, antimicrobial substances, fungicidal agents, and the like, or any combination thereof.

As a result of adding various one or more additives to the blending of raw materials, the additives may be present in the final composite stone product, and may further change various characteristics of the final composite stone product. Such characteristics may include, for example, physical properties, such as: color, texture, display pattern, and the like; chemical properties, such as, for example, chemical resistance, pH properties, and the like; biological properties, such as, for example, antibacterial properties, and the like; and/or mechanical properties, such as, for example, strength, scratch resistance, impact resistance, and the like.

The resulting mixture may later be poured to a support or a temporary support, such as rubber, paper, plastic or any other polymeric material, water soluble paper, silicon sheet or the like with or without a support frame or a shaping frame, a mold such as a rubber tray mold or any other appropriate support. The mixture is poured substantially in the form of a desired slab (for example, at a size of 306 cm×144 cm with or without wall shaping).

The mixture may then be compacted by a special vacuum and vibration process such as vibrocompaction at high pressure, such as about 100 tons. Then, the compressed mixture may be placed in a curing and/or hardening kiln, for example, at a temperature in the range of 80° C. to 115° C. for 30 to 60 minutes until it hardens and assumes natural stone properties, but with greater performance and higher resistance to stains and impact, as detailed below.

After completion of the casting process, the slabs may be flattened, gauged, calibrated and polished to a high and enduring shine or any desired finish to be used at various settings, such as, for example, interior wall cladding, fireplace mantles and surroundings, wainscots and wall bases, bank teller lines, table and desktops, elevator cab walls and floors, floor tile and stair treads, food service areas, shower and tub surrounds, toilet compartment partitions, window seats and countertops.

Composite stone material that may be composed mainly of organic polymer(s) and inorganic quartz matrix, manufactured as described hereinabove may possess enhanced properties as compared to natural stones. For example, the composite stone material may exhibit flexural strength in the range of about 485-545 $Kg/Cm^2$. For example, the composite stone material may exhibit flexural strength of about 515 $Kg/Cm^2$. Water absorption by weight of the composite stone material may be at the range of about 0 to 0.04 percent. For example, water absorption by weight of the composite stone material may be about 0.02 percent. Compressive strength of the composite stone material may be in the range of 2000-2400 $Kg/Cm^2$. For example, compressive strength of the composite stone material may be about 2200 $Kg/Cm^2$. Freezing compressive strength (after 25 cycles of freeze-thaw) of the composite stone material may be in the range of 1800-2400 $Kg/Cm^2$. For example, freezing compressive strength (after 25 cycles of freeze-thaw) of the composite stone material may be about 2082 $Kg/Cm^2$. Absorption of the composite stone material may be in the range of 0 to 0.004 percent. For example, absorption of the composite stone material may be about 0.002 percent. Density of the composite stone material may be in the range of 60 to 80 $g/Cm^2$. Mohs hardness of the composite stone material, as may be determined by a scratch test may be in the range of 5-8, on a scale of 1-10, wherein 10 is diamond. For example, Mohs hardness of the composite stone material may be about 6.5. Taber abrasion index at 1000 cycles of the composite stone material may be in the range of 110-270. Thermal expansion of the composite stone material may be in the range of 7.5-10 (X0.000001 in/in/deg C.). Stain resistance of the composite stone material may be in the range of 50-64 (wherein the maximal rating is 64). Ball impact resistance of the composite stone material may be in the range of 80 to 200 cm. Radiant heat resistance of the composite stone material demonstrates no damage. Likewise, boiling water and high temperature do not demonstrate an effect on the composite stone material.

As referred to herein, the terms "lumps", "lumps of artificial", "lumps of composite stone material", "nuggets", and "blobs" may interchangeably be used.

As referred to herein, the terms, "composite stone material", "artificial marble", "engineered stone" and "quartz surfaces" may interchangeably be used.

As referred to herein, the term "colorant" may include dyes, pigments, colorants, and the like, or any combination thereof in any form, such as liquid, paste, fluid, or the like.

As referred to herein, the terms "blade", "leg", "hook" in relation to a mixing device may interchangeably be used. For example, the terms "mixer blade" and mixer leg" may interchangeably be used.

According to some embodiments, lumps of composite material may be prepared and may further be used for the manufacturing of artificial marble and artificial marble slabs. The lumps of composite material may be comprised of various compositions of such materials as inorganic quartz matrixes, polymers, binders, resins, colorants, dyes, pigments, and the like. The lumps of composite materials may assume any three-dimensional shape, such as, for example, squared shape, rounded shape, spiked shape, diamond-like shape, and the like, and may further be prepared in any size. The lumps of composite material may further exhibit any surface type, such as smooth surface, uneven surface, rigid surface, and the like. The lumps of composite material may further be used for the preparation of artificial marble that may exhibit various patterns that may be formed by the lumps of composite material.

According to some embodiments, lumps of composite material may be manufactured such that they acquire a substantially rounded shape, with a substantially smooth surface and a substantially rigid texture. Upon their production, the lumps may retain their structure under various conditions. The lumps of composite material may include such materials as inorganic quartz matrix, such as sand, of various particle sizes and/or any other material that may contain inorganic quartz; a mixture of polymers, such as unsaturated polyester diluted with styrene; additional mixtures that may include such materials as silane molecules, binders, hardeners, initiators, inhibitors, pigments, dyes, colorants, and the like. Upon manufacturing of the lumps of composite materials, the lumps may further be used for the preparation of patterned artificial marble articles, such as patterned artificial marble slabs, wherein the lumps formed into the artificial marble articles may create the exhibited pattern of the artificial marble.

According to some embodiments, the inorganic quartz material may include sand of various particle sizes and indifferent combinations. For example, the quartz containing sand may include particles of a size of about of 0.05 mm to 10 mm. The quartz containing sand may include particles of a size of about of 0.05 mm to 8 mm. The quartz containing sand may include particles of the size of about 0.05 mm to 7 mm. The quartz containing sand may include particles of the size of about 0.05 mm to 6 mm. The quartz containing sand may include particles of the size of about 0.05 mm to 5.5 mm. The quartz containing sand may include particles of the size of about 0.05 mm to 5 mm.

In some embodiments, the inorganic quartz material may further include ground/milled sand of various particle sizes and in different combinations. For example, the ground/milled quartz containing sand may include grounded particles of the size of about 1 to 65 microns. The ground/milled quartz containing sand may include particles of the size of about 10 to 60 microns. The ground/milled quartz containing sand may include particles of the size of about 20 to 55 microns. The ground/milled quartz containing sand may include particles of the size of about 30 to 50 microns. The ground/milled quartz containing sand may include particles of the size of about 38 to 45 microns. The inorganic quartz material may further include such materials as basalt, glass, diamond, rocks, pebbles, shells, silicon, and any other material that may contain inorganic quartz.

In some embodiments, the lumps of composite material may further include resin that may be mixed with the quartz particles to allow formation of the lumps structures. The resin may be comprised of polymers and binders. The polymers may include, for example, such materials as polyester, unsaturated polyester and the like, that may be diluted with, for example styrene. For example, the polymer may be comprised of 65% of unsaturated polyester, diluted with 35% styrene. The binders may include a mixture of various components, such as initiators, hardeners, catalysators, binding molecules and bridges, such as Silan bridges, and any other component that is known in the art and may be used for the preparation of composite stone material. In some embodiments, resin may be or may include various types of material(s), for example, polyester, Epoxy, acrylic, vinylester, thermo plastic materials or products, or the like.

According to some embodiments, the lumps of composite material may further include a colorant that may include various dyes, pigments, colorants or any combination thereof. The colorants may be in the form of liquid, powder, paste, and the like, or any combination thereof. The colorants may include any organic or non-organic colorant. The colorants may further be diluted with various materials, such as polyester, styrene, butyl benzoate, methoxy propyl acetate, and the like. The colorants may be added at various stages during the manufacturing process of the lumps of composite material. The colorants may be added in various concentrations and various amounts during various stages of the manufacturing process. Furthermore, one or more colorants and/or a combination of colorants may be added during various stages of the manufacturing procedures of the lumps of composite materials.

According to some embodiments, the preparation of lumps of composite material may be performed in one or more mixing devices. The mixing devices may include any known mixing device, such as, for example, a mixer, a vertical axis mixer, a drum mixer, palletizer, and the like, or any combination thereof. In addition, the modifications to the mixing device may also be performed, wherein said modifications may aid in the preparation process of the lumps of composite material.

According to some demonstrative embodiments, the preparation of lumps of composite material may be performed using a mixer. The mixer may include any kind of mixer, such as a vertical axis mixer. For example, the mixer may include a vertical mixer as described in United States Patent Application Publication Number 2008/0181049, titled "Vertical-Axis Mixing Machine for Processing Mixes", published on Jul. 31, 2008, which is incorporated herein by reference in its entirety. Other suitable mixers may be used.

In some embodiments, the mixer may have one or more mixing legs that may be attached to a common arm (that may be aligned with the revolving axis) and may thus revolve around a common axis. The mixing legs may be placed at varying distances from each other and may be located at any angle relative to the common axis. The mixer legs may revolve independently from each other, the mixer legs may revolve in synchronization with each other, or any combination thereof. The mixer may further include a container (such as a mixing bowl), into which various components of the lumps' composition may be added at an appropriate, predetermined order; at an appropriate time schedule; and at appropriate mixing conditions.

Mixing conditions may include such conditions as mixing speed, mixing temperature and mixing blades that may be used. For example, mixing speed may be measured in units of rotational speed (rounds per minute (rpm)) and/or in units of peripheral speed (m/sec). For example, mixing speed may vary between different stages of the manufacturing process of the lumps of composite material and may be in the range of, for example, 1 to 15 m/sec. The mixing speed may include mixing at low speed, such as, for example in the range of, about 1 to 2 m/sec. For example, mixing temperature may be measured as the environment temperature or the container temperature at which the mixing procedure is being performed. For example, the mixing temperature may be in the range of 4 to 40 degrees Celsius. For example, the mixing temperature may be performed at room temperature, such as, for example, at the temperature of about 25 degrees Celsius.

In addition, one or more of the mixing blades (mixing legs) used in the mixer may be adapted to be used for the formation of the lumps of the composite material. According to some embodiments, one or more of the mixer blades (legs) may be modified and adapted such that, at the end of the blades, at the region that contacts the materials to be mixed, an extended surface area may form. The extended surface area may be achieved, for example, by attaching an extension of various forms to the end of the mixing blade. The extension may assume various forms, such as, but not limited to: a flat, quadrangular plate; a plate that may be comprised of at least two flat surfaces; a spoon shaped plate, curved plate, and the like. The extension may further be situated at various angles as compared to the perpendicular axis of the mixer blade. In some embodiments, no additional spoon or spoons may be required, and the rod that is in the mixer may be used.

Reference is made to FIG. 1, which schematically illustrates modified mixing blades, according to some embodiments. As shown in FIG. 1A, which illustrates a front view of a modified mixing blade, according to some embodiments, an extension (such as extension 4 in FIG. 1A) may be attached to the mixing end (such as end 6) of the mixing blade (such as mixing blade 8). Extension 4 may have a shape of a flat quadrangular plate, wherein the mixing blade is attached at any point on the upper rib (10) of the circumference of the plate. The extension plate may be connected at various angles relative to the perpendicular axis (such as axis y in FIG. 1A) of the mixing blade.

Figure 1B:
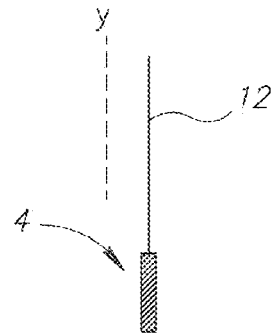
Figure 1C:
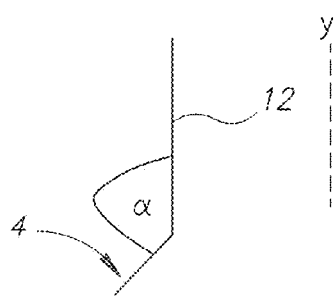

Reference is made to FIGS. 1B and 1C, which illustrate a side view of a mixing blade with an extension plate. As shown in FIG. 1B, extension plate 4 may be attached to mixing blade 8 perpendicularly (at 0 degrees) to the perpendicular axis (y) of the mixing blade (12). As shown in FIG. 1C, extension plate 4 may be attached to mixing blade 8 at an angle ($\alpha$), which may be the angle between the upper rib (10) of the circumference of extension plate (4) and the perpendicular axis (y) of the mixing blade (12). Angle $\alpha$ may be any angle in the range of 0-180 degrees. According to other embodiments, extension to the mixing blade may include a plate that may have at least two planar flat quadrangle surfaces that may be positioned at any angle relative to each other.

Figure 1D:
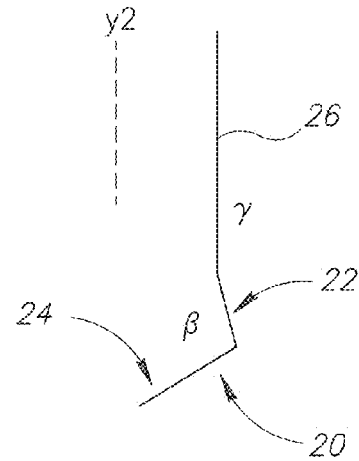

As shown in demonstrative manner in FIG. 1D, which illustrates a side view of a mixer blade with an extension, according to some embodiments, the surfaces, such as upper surface 22 and lower surface 24, may be positioned at an angle $\beta$ relative to each other, to form extension 20. Angle $\beta$ may be any angle in the range of 0 to 90 degrees. Extension 20 may be situated at any angle ($\gamma$) relative to the perpendicular axis (y2) of the mixing blade (26), wherein angle $\gamma$ may be any angle in the range of 0-180 degrees and may be the angle between the upper rib (not shown) of the circumference of the upper surface (22) of extension plate (20) and the perpendicular axis (y2) of the mixing blade (26). Angle $\gamma$ may be any angle in the range of 0-180 degrees. According to other embodiments, the extension of the mixing blade may include any concaved shaped form, such as, for example, a spoon shaped form.

Figure 1E:
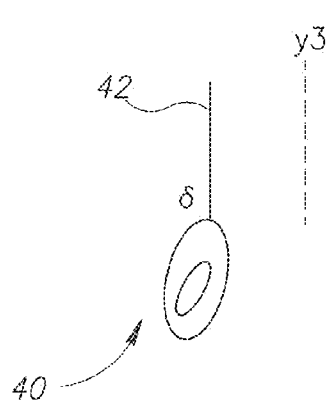

As shown in FIG. 1E by way of example, of a side view of a mixing extension, according to some embodiments, extension 40 may have a concaved, spoon-like shape that may be attached to the mixing blade (42). Extension 40 may be attached to mixing blade 42 at an angle (δ), which may be the angle formed between the central perpendicular axis (y3) of extension, such as extension 40 and the perpendicular axis (y3) of the mixing blade (42). Angle δ may be any angle in the range of 0-180 degrees.

Figure 1F:
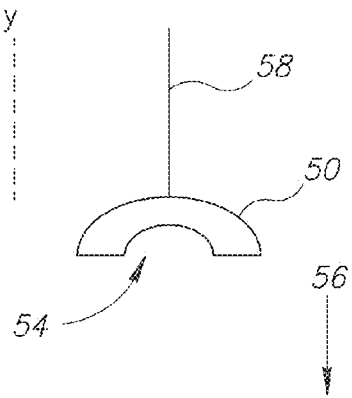

As shown in FIG. 1F, which illustrates a front view of a modified mixing blade, according to some embodiments, an extension (such as extension 54 in FIG. 1F) may be attached to the mixing end (such as end 56) of the mixing blade (such as mixing blade 58). Extension 54 may have a curved shape, and the mixing blade may be attached at any point on the upper rib (50) of the circumference of the extension plate. The extension plate may be connected at various angles relative to the perpendicular axis (such as axis y in FIG. 1F) of the mixing blade.

In some embodiments, attachment between the mixing blade and the extension may be performed by one or more of various suitable methods such as, for example, adhering, welding, mechanical fitting, by use of bolts and nuts, and the like. The attachment between the mixing blade and the extension may be reversible, detachable, or permanent. Attachment between the mixing blade and the extension may be performed such that the extension may form as an integral part of the mixing blade and/or as an integral extension of the mixing blade. Attachment between the mixing blade and the extension may be reversible and/or detachable, and may allow changing the extension that may connect to the mixing blade.

In some embodiments, use of mixing blade extension such as the extensions exemplified hereinabove may aid in the formation of a desired form of the lumps of composite material. For example, the mixing process with the various extensions may result in a scooping action that may mix while shaping the form of the resulting lumps. For example, as a result of the scooping actions of the modified mixing blades, substantially rounded ball-like shaped lumps may be formed. Moreover, in some embodiments, the scooping action may yield increasingly larger lumps, wherein the diameter of the rounded ball shaped lumps may be increased as a result of the continuous mixing action. The effect of the increasingly larger lumps may also be named herein as the "snow ball effect", as it may resemble in concept the formation of a snow ball, wherein the more turns the ball revolves, the more material ("snow") is collected on the face of the ball, and as a result the diameter of the ball is increased.

According to some embodiments, the mixer may include a drum mixer. A drum mixer may include a revolving drum that may be used for mixing of materials contained within the interior of the drum. As a result of the revolving movement of the drum along a central axis, the materials inside the drum may mix. In addition, the drum mixer may include a modified drum, wherein the interior walls of the drum may include ridges and/or perforations that may function as mixing blades that may increase the mixing efficiency and may further aid in a desired formation of lumps of composite materials. The cavity of the drum may include mixing blades that may be situated in any location within the drum cavity. The mixing blades may revolve independently of the mixing drum and may thus increase efficiency of the mixing and further aid in the formation of lumps of composite material.

Figure 2:
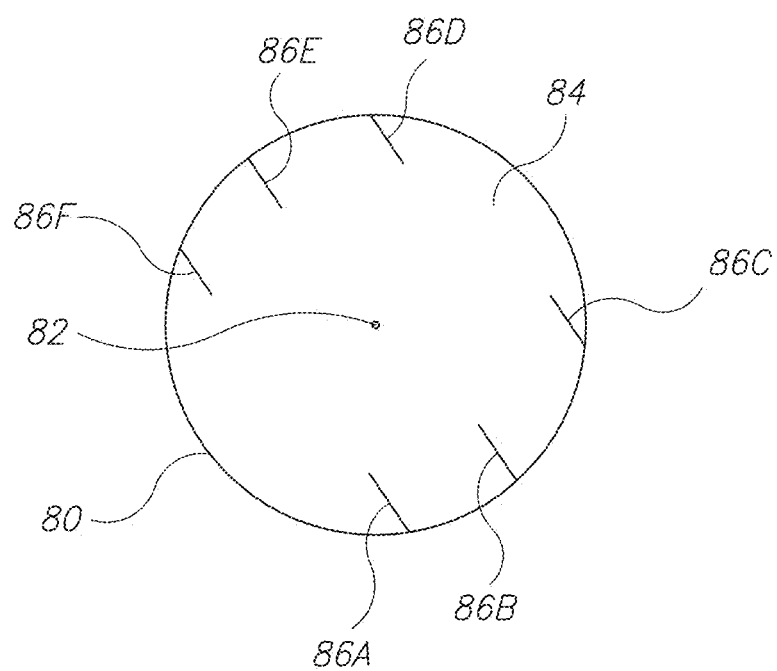
FIG. 2 is a schematic illustration of a front view of a drum mixer, in accordance with some demonstrative embodiments.

Reference is made to FIG. 2, which schematically illustrates a front view of a drum mixer, according to some embodiments. As shown in FIG. 2, the drum mixer may include a mixing drum, such as drum 80 that may revolve clockwise around axis 82. A drum, such as drum 80, may include inner cavity, such as cavity 84 into which various materials to be mixed may be added. The interior walls of a drum, such as drum 80, may include perforations and ridges, such as ridges 86A-F, that may be situated at various distances along the interior walls of drum 80. Ridges, such as 86A-F may include flat elongated ridges that may protrude from the interior walls of the drum towards the cavity of the drum. Ridges on the interior walls of the drum may include any number of ridges that may be situated at varying distances from each other along the interior walls of the drum. The ridges on the interior walls of drum 80 may form as an integral part of the interior walls of the drum, or may be attached by various methods to the interior walls of the drum.

According to some embodiments, the ridges along the interior walls of the mixing drum may aid in the formation of a desired form of the lumps of composite material that may be mixed in the drum cavity. The revolving motion of the drum, in combination with the ridges in the interior walls of the mixing drum, may result in a scooping action that may mix while shaping the form of the resulting lumps. For example, as a result of the scooping actions of the revolving drum with the ridges on its interior walls, substantially rounded ball-like shaped lumps may be formed. Moreover, the scooping action may yield increasingly larger lumps, wherein the diameter of the rounded ball shaped lumps may be increased as a result of the continuous mixing action, in the snowball effect.

According to some embodiments, there is provided a method of manufacturing lumps of composite materials. The method may include, for example, mixing various quartz containing compositions, such as sand, of various particle sizes; addition of various colorants in various concentrations and amounts; additions of various resins, such as resins described hereinabove; at any predetermined order of addition and at any time predetermined time intervals between the various additions.

In some embodiments, the mixing may be performed in a mixer that may include modified mixing blades, in a drum mixer that may include a modified drum interior or an additional mixing blade(s), in a pelletizer and/or any combination thereof. The method may further result in the production of lumps, wherein at least 60% of the mixture is converted to lumps at the termination of the process and wherein the lumps thus produced retain a stable structure. According to some embodiments, the method may further result in the production of lumps, wherein at least 85% of the mixture is converted to lumps at the termination of the process and wherein the lumps thus produced retain a stable structure. The lumps of composite materials thus manufactured may acquire the shape of, for example, substantially round balls, with a substantially smooth surface.

In some embodiments, the manufactured lumps of composite material may further be used for the preparation of artificial marble slabs. To this aim, the lumps of composite material may be poured into a mold in the form of a slab, which may then be compacted by a special vacuum and vibration process, at a pressure of about 100 tons. Then the slabs may be placed in a curing kiln, until they harden. The hardened slabs formed in this manner may exhibit a display pattern comprised of the arrangement of the lumps of the composite material within the compacted artificial marble slabs.

According to some embodiments, the properties of the lumps of composite material, such as shape, size, color, texture, strength, and the like may be determined by various factors. The factors may include chemical factors (such as mixture compositions), physical factors (such as size and form of particles in the mixture), mechanical factors (speed of mixing, type of mixer and mixing blade used), and the like. For example, the factors may include such factors as: the order at which the various constituents of the lumps are added into the mixture; the time intervals at which the various constituents are added into the mixture; the properties and appearance of the various constituents that are added into the mixture (size of particles, powder, liquid, and the like); the time intervals between the addition of the various constituents of the mixture (such as colorants, resins, and the like); the speed of mixing after and during addition of the various mixture constituents; the type and size of extension of the mixing blade; the size of the resulting lumps, the distribution of the resulting lumps in the slab, and the like.

According to some embodiments, the process of the preparation of lumps of composite material may include a continuous process and/or batch process. For example, in a batch process, a mixture of various materials is mixed according to the manufacturing process, and the lumps that form may be collected at the end of the manufacturing process, which may terminate when the materials are all used or converted to lumps. In a continuous process, a continuous supply of materials is added to the mixture, and lumps are continuously formed and collected, throughout the manufacturing process.

According to some embodiments, the method for manufacturing lumps of composite material may include such steps as, for example: unloading quartz particles, such as in the form of sand in the size of about 0.01 mm to 8 mm into a mixer bowl. For example, the size of the quartz particles may be in the range of, for example 0.065 mm to 2 mm. The mixer may be equipped with modified mixing blades that may include extensions, such as in the form of spoons. The mixer may mix at a speed in the range of, for example 6 to 14 rpm.

Into the mixture, a colorant may be added. The colorant may be in the form of a powder or a liquid. The quartz particles and the colorant may be mixed at a speed of 1 to 10 rpm for about 1 to 10 seconds, after which the speed may be increased to, for example, the range of 12 to 24 rpm for additional 30 to 90 seconds.

Into the mixture of quartz particles and colorant, a resin may be added. Addition of the resin may be performed while the mixer is mixing at a speed of, for example, 4 to 12 rpm. Upon addition of the resin, it may be mixed with the mixture of quartz particles and colorant at a speed of, for example, 1 to 10 rpm, and then the speed may be increased to a speed of, for example, 8 to 24 rpm.

Then, additional quartz particles may be added to the mixture, while the mixture is mixing at the speed of about 2-12 rpm. The quartz particles added may be in the form of ground/milled quartz containing sand that may include particles of the size of about 1 to 60 microns. For example, the added ground/milled sand may include particles in the size of about 1 to 38 micron. For example, the added ground/milled sand may include particles in the size of about 38 to 45 micron.

Upon addition of the ground sand particles to the mixture, the mixer may mix at a speed in the range of 2 to 12 rpm for 1 to 20 seconds, after which the mixer speed may be increased to a speed in the range of 12 to 26 rpm for a length of time of 20 to 80 seconds. Then, additional resin composition may be added to the mixture, while the mixer is mixing at a speed in the range of about 2 to 14 rpm. Next, one or more additional colorants may be added, together or sequentially, and mixed under conditions as above. The next mixing step of the resulting mixture may include, for example, mixing at a speed in the range of 8 to 22 rpm for 10 to 80 seconds.

The final mixing step of the resulting mixture may include, for example, mixing at a speed of 2 to 14 rpm for about 500 to 1500 seconds. The final mixing step may be performed in the presence of colorant, which may result in the formation of lumps that may include a color coating at their outer surface. Furthermore, after the final mixing step, a colorant may be added to the mixture, and the mixer may mix for additional 10-120 seconds, at a speed of 2-12 rpm. This step may further result in the formation of lumps that may include a color coating at their outer surface. Other suitable operations may be used; and other suitable mixing speeds may be used at the various stages of the process.

According to some embodiments, the method for manufacturing lumps of composite material may result in the formation of substantially smooth, round, shaped lumps that may exhibit various colors and various sizes. In some embodiments, timing of addition of the colorant(s) to the mixture of the lumps of composite materials, amount of colorant(s) added to the mixture, and/or type of colorant(s) added to the mixture, may determine the final appearance of the resulting lumps. For example, in some embodiments, the lumps may exhibit more than one color that may be distributed within and/or on the surface of the lumps. For example, in some embodiments, the color(s) may be distributed evenly within the lumps; the colors may be distributed evenly on the surface of the lumps; the colors may be distributed unevenly within the lumps; the colors may be distributed unevenly on the surface of the lumps, and/or any combination thereof. According to some embodiments, the interior layers (core) of the lumps may include one or more colorants, and the exterior layer (surface) of the lumps may be coated with additional colorant(s).

According to some embodiments, the lumps of composite material manufactured as detailed hereinabove may be used for the preparation of patterned artificial marble and/or patterned artificial marble slabs. For example, lumps of a desired form (for example, rounded lumps); and of a desired size (for example, a diameter of 0.01-10 cm, a diameter in the range of 0.5-2 cm, and the like); and of a desired texture (for example, smooth); of a desired color or combination of colors; and of a desired color distribution (for example, within the lumps, at the external surface of the lumps, and the like) may be used for the preparation of artificial marble slabs. The lumps may be mixed with one or more additional materials such as: organic polymer(s) (like resins); inorganic quartz matrix; linkers (such as silane molecules); additional colorants (such as dye, pigments, and the like); chemical reagents; antimicrobial reagents; and the like that may be used in the creation of the artificial marble slabs. The resulting mixture may be poured into a mold in the form of a slab (for example, at a size of 306 cm×144 cm). The slab may then be compacted by a special vacuum and vibration process at a pressure of about 100 tons. Then the slabs may be placed in a curing kiln, for example, at 80° C. to 115° C. for 30 to 45 minutes until they harden and assume natural stone properties, with a pattern that may be created by the lumps of composite material that were used for the preparation of the artificial marble.

Figure 3A:
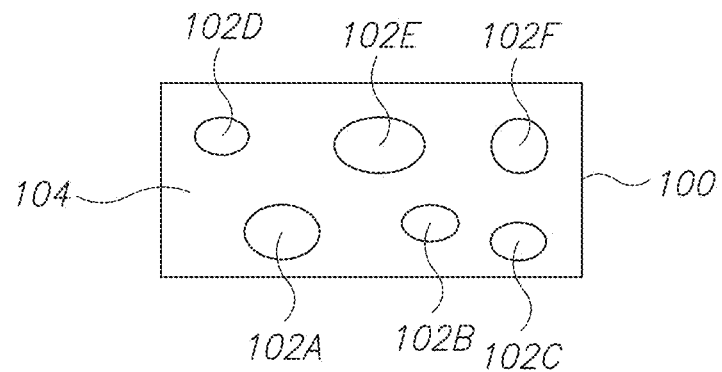
FIGS. 3A-3B are schematic illustrations of artificial marble, in accordance with some demonstrative embodiments.
Figure 3B:
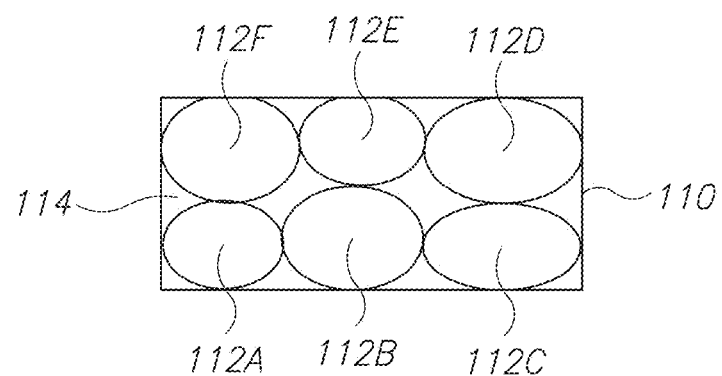

Reference is made to FIGS. 3A-3B, which illustrate schematic drawings of artificial marble slabs, manufactured by using lumps of composite material, according to some embodiments. As mentioned hereinabove, the characteristics of the lumps used for the preparation of the artificial marble slabs, such form of the lumps, size of the lumps, texture of the lumps, color of the lumps, color distribution of the lumps, and the like, may determine the pattern of the artificial marble slabs.

For example, FIG. 3A schematically illustrates an artificial marble slab prepared by use of lumps and additional materials, as detailed hereinabove. As shown in FIG. 3A, an artificial marble slab, such as slab 100, may exhibit a pattern that may be created by lumps, such as lumps 102A-F. In some embodiments, lumps, such as lumps 102A-F, may be small diameter round lumps, and the space between the lumps (non-agglomerated material, 104) may include additional materials, such as organic polymer inorganic quartz matrix; linkers such as silane molecules, and the like may be used as fillers.

An additional example is shown in FIG. 3B, which schematically illustrates an artificial marble slab prepared by use of lumps and additional materials, as detailed hereinabove. As shown in FIG. 3B, an artificial marble slab, such as slab 110, may exhibit a pattern that may be created by lumps, such as lumps 112A-F. In some embodiments, lumps, such as lumps 112A-F, may be large diameter round lumps. The small space that may form between the lumps (non-agglomerated material, 114) may include additional materials, such as organic polymer inorganic quartz matrix; linkers such as silane molecules, and the like.

Reference is made to FIGS. 3C-3J, which show demonstrative pictures of artificial marble slabs, prepared by use of lumps and additional materials, as detailed hereinabove.

Figure 3C:
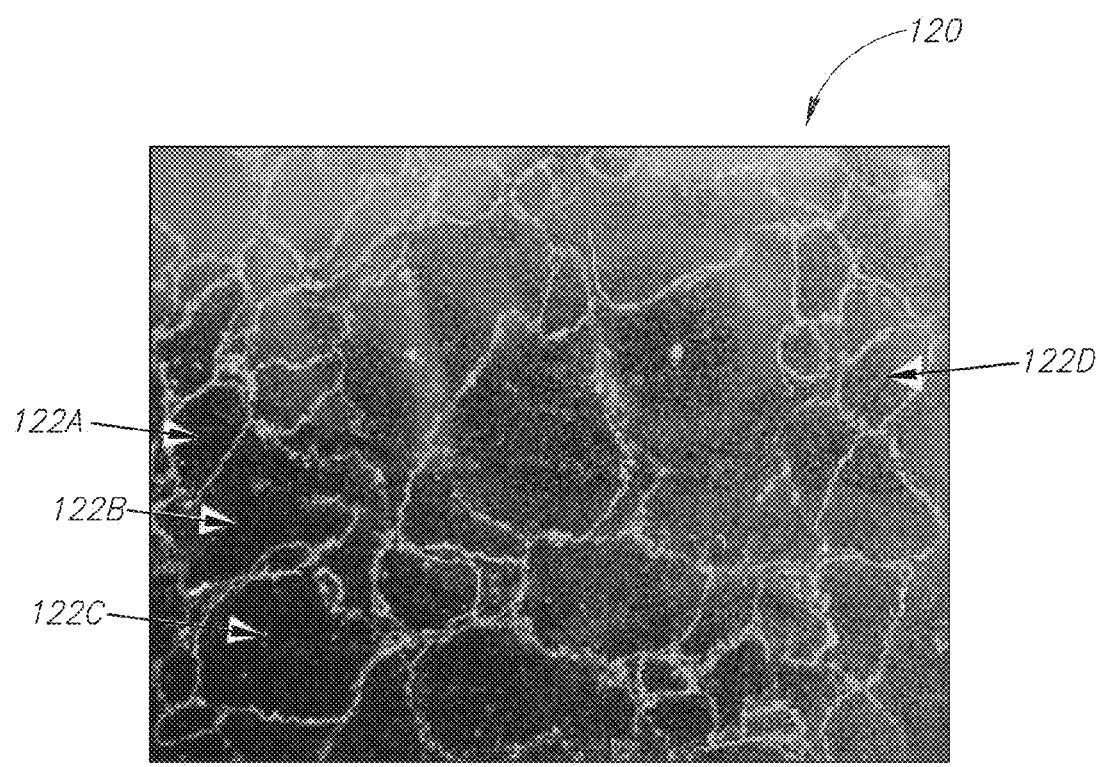
FIGS. 3C-3J are images of demonstrative artificial marble slabs, in accordance with some demonstrative embodiments.

As shown in FIG. 3C, an artificial marble slab, such as slab 120, may exhibit a pattern that may be created by lumps, such as, for example, lumps 122A-D. Lumps, such as 112A-D may be substantially round (circular) lumps that may comprise essentially most of the area of the artificial marble slab. The lumps may include one or more colorants, wherein the inner layer (core) of the lump is of a different color than the outer layer (surface) of the lump.

Figure 3D:
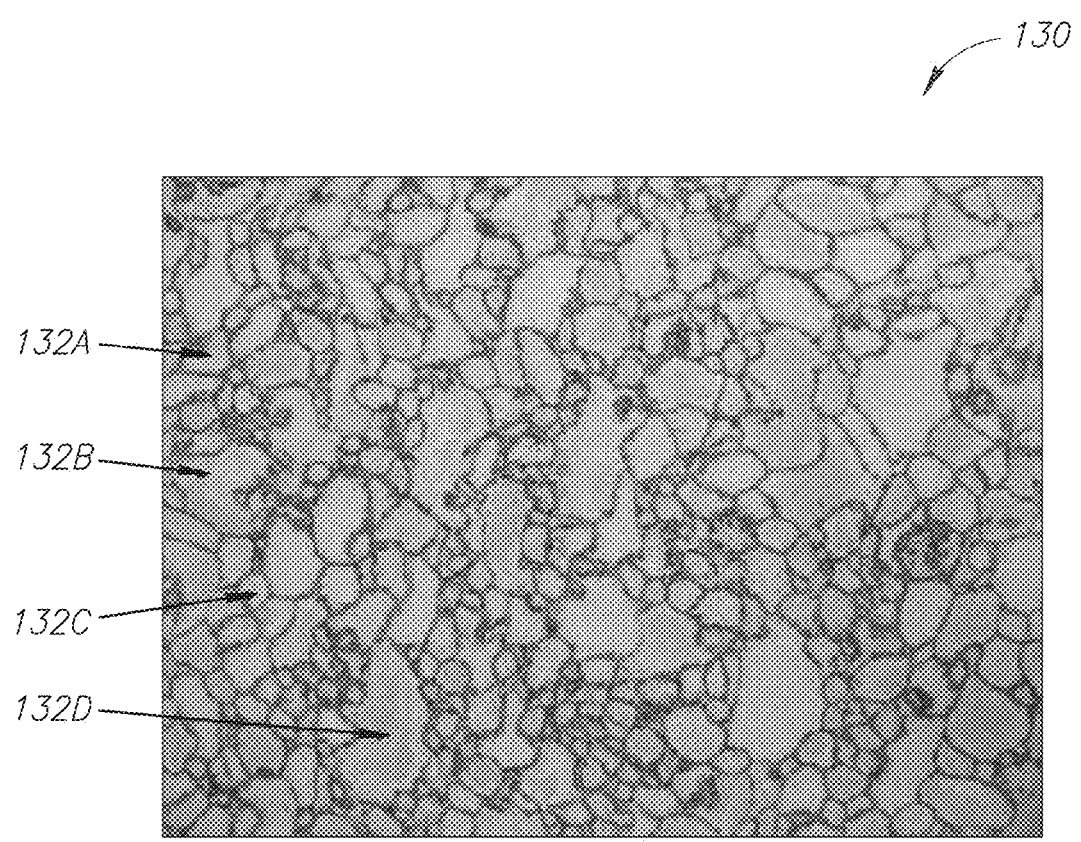

As shown in FIG. 3D, an artificial marble slab, such as slab 130, may exhibit a pattern that may be created by lumps, such as lumps 132A-D. Lumps, such as, for example, 132A-D may be substantially circular lumps that may comprise essentially most of the area of the artificial marble slab. The lumps may include one or more colorants, dispersed in various layers of the lump.

Figure 3E:
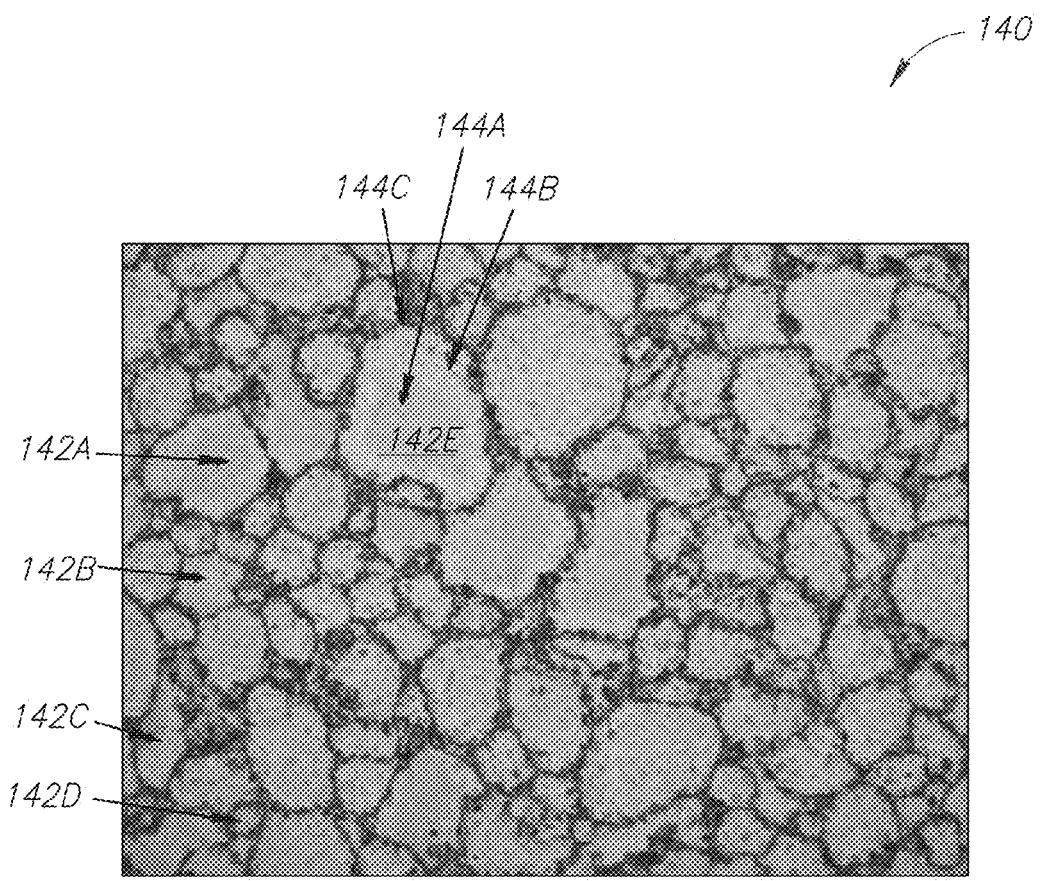

As shown in FIG. 3E, an artificial marble slab, such as slab 140, may exhibit a pattern that may be created by lumps, such as, for example, lumps 142A-D. Lumps, such as 142A-D may be substantially circular lumps that may comprise essentially most of the area of the artificial marble slab. The lumps may include one or more colorants in various layers of the lump composition. For example, a lump, such as lump 142E may include a first colorant (144A) and second colorant (144B) at internal layers (core); and an additional colorant (144C) coating the outer layer (boundaries/surface) of the lump.

Figure 3F:
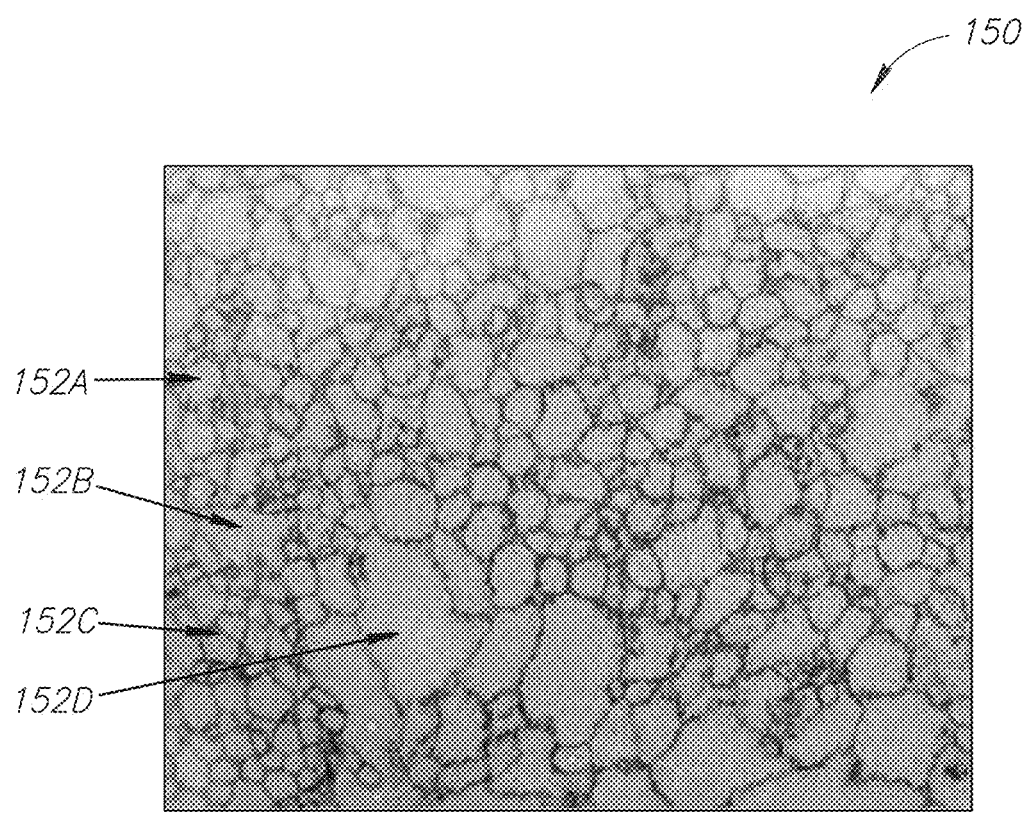

As shown in FIG. 3F, an artificial marble slab, such as slab 150, may exhibit a pattern that may be created by lumps, such as, for example, lumps 152A-D. Lumps, such as 152A-D, may be substantially circular lumps that may comprise essentially most of the area of the artificial marble slab. The lumps may include one or more colorants, dispersed in various layers of the lump.

Figure 3G:
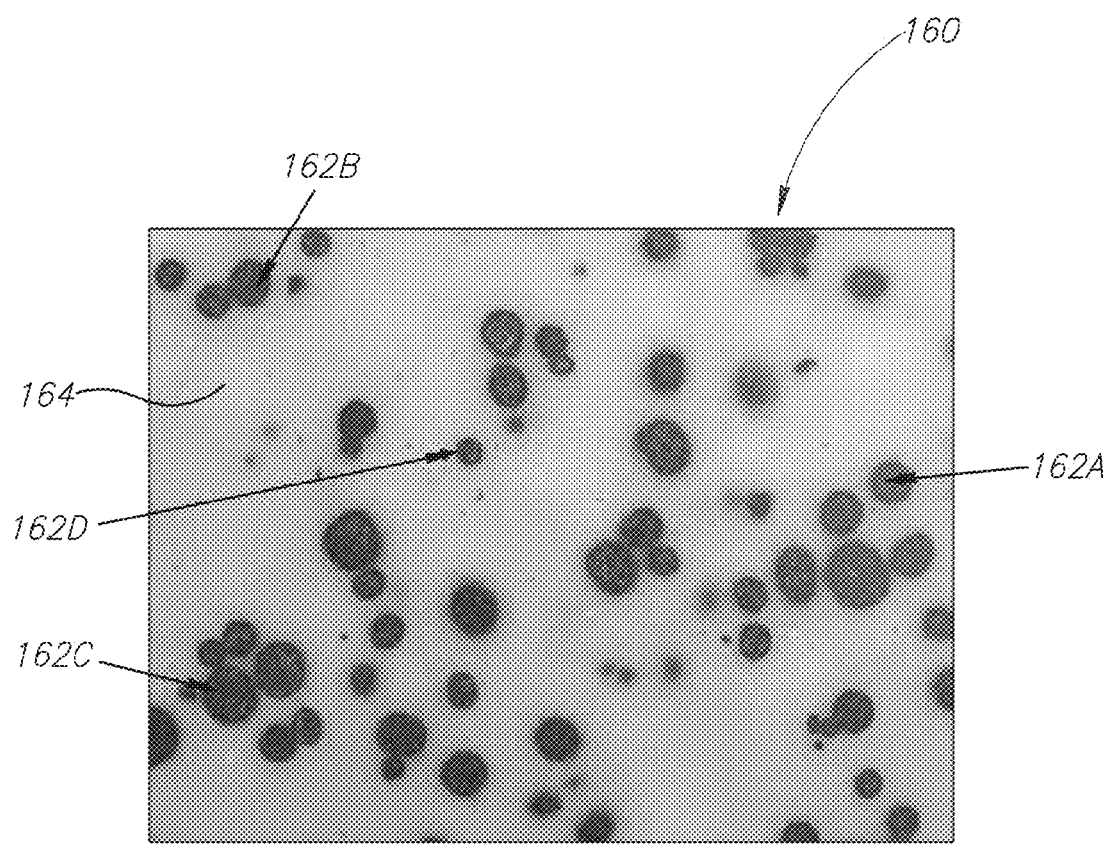

As shown in FIG. 3G, an artificial marble slab, such as slab 160, may exhibit a pattern that may be created by lumps, such as lumps 162A-D. Lumps, such as 162A-D, may be substantially round lumps that may comprise at least part the area of the artificial marble slab. The space between the lumps, shown as bright background is the non-agglomerated material (164) of the slab. The lumps may include one or more colorants, dispersed in various layers of the lump.

Figure 3H:
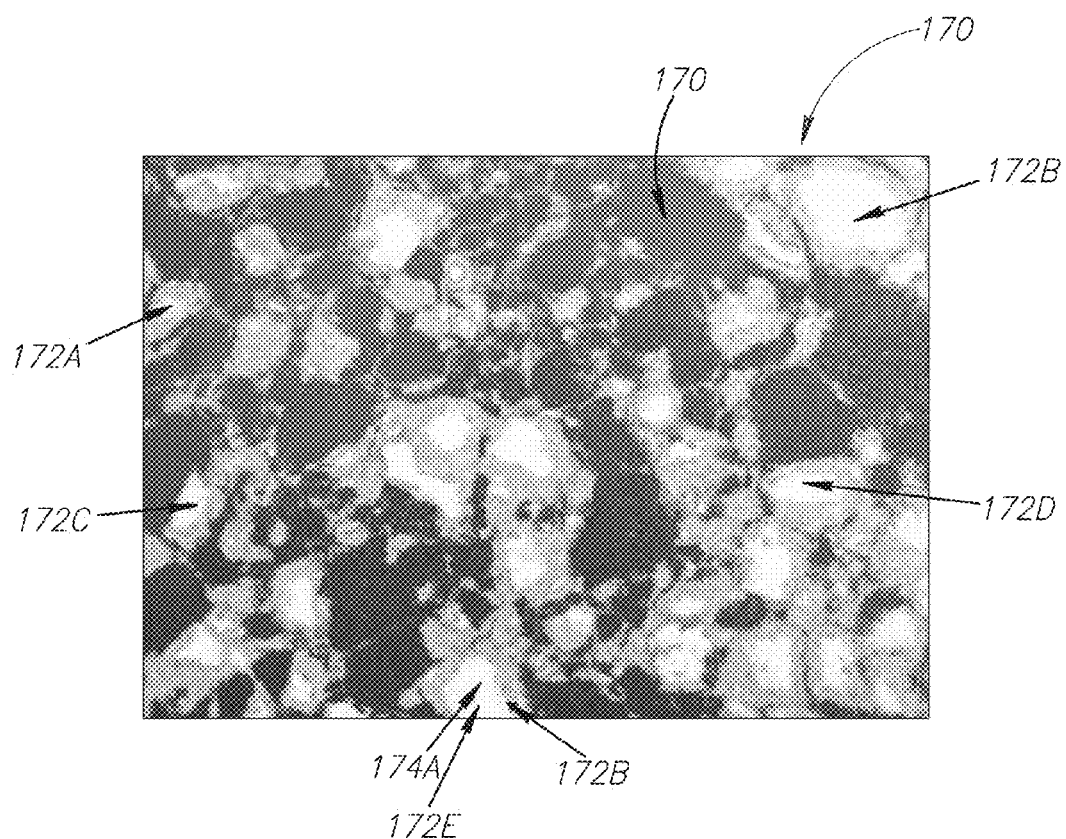

As shown in FIG. 3H, an artificial marble slab, such as slab 170, may exhibit a pattern that may be created by lumps, such as, for example, lumps 172A-D. Lumps, such as 172A-D may be substantially amorphous lumps that may comprise at least part of the area of the artificial marble slab. The space between the lumps, shown as dark background, is the non-agglomerated material of the slab; or, in some embodiments, other lumps or blobs, or other air-free or substantially air-free region or lump-filled area. The lumps may include one or more colorants at various layers of the lump composition. For example, a lump, such as lump 172E, may include a first colorant (174A) at an internal layer (core) and additional colorant (174B) at an outer layer of the lump.

Figure 3I:
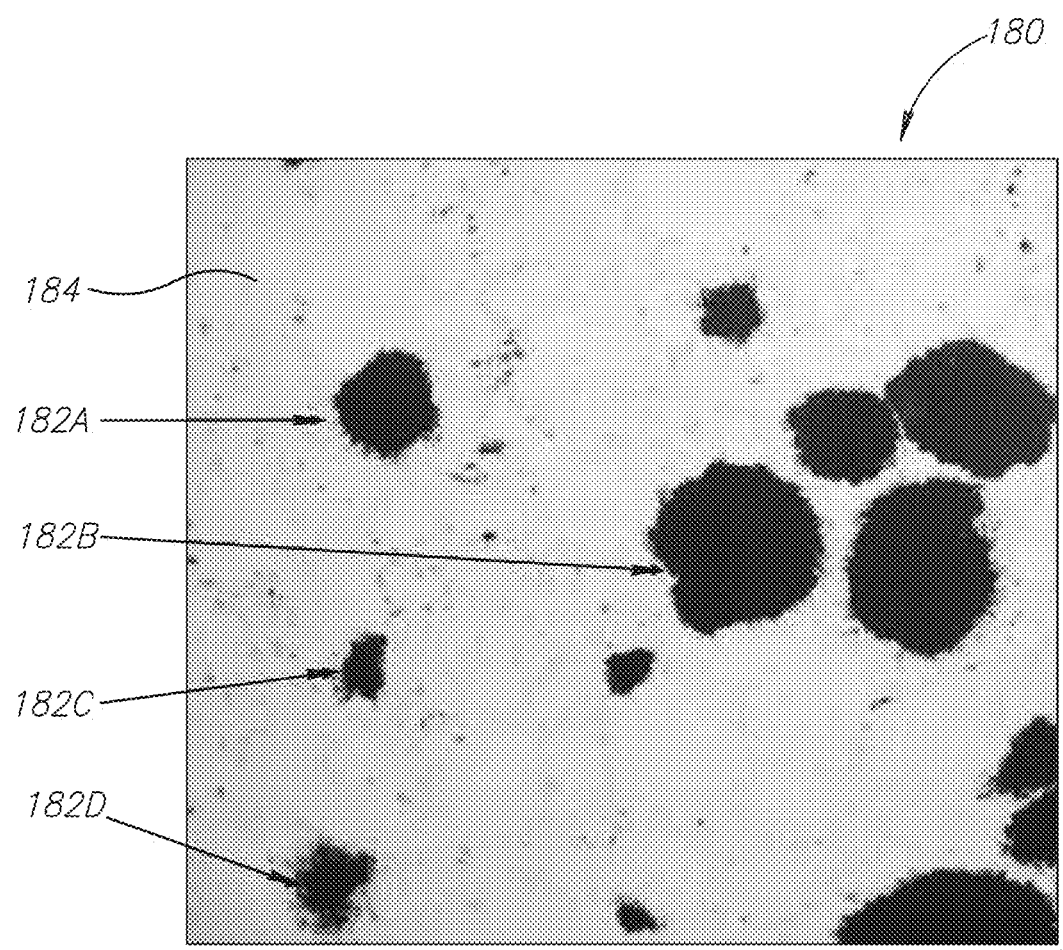

As shown in FIG. 3I, an artificial marble slab, such as slab 180, may exhibit a pattern that may be created by lumps, such as, for example, lumps 182A-D. Lumps, such as 182A-D may be substantially circular-spiked lumps that may comprise at least part of the area of the artificial marble slab. The space between the lumps, shown as bright background is the non-agglomerated material (184) of the slab.

Figure 3J:
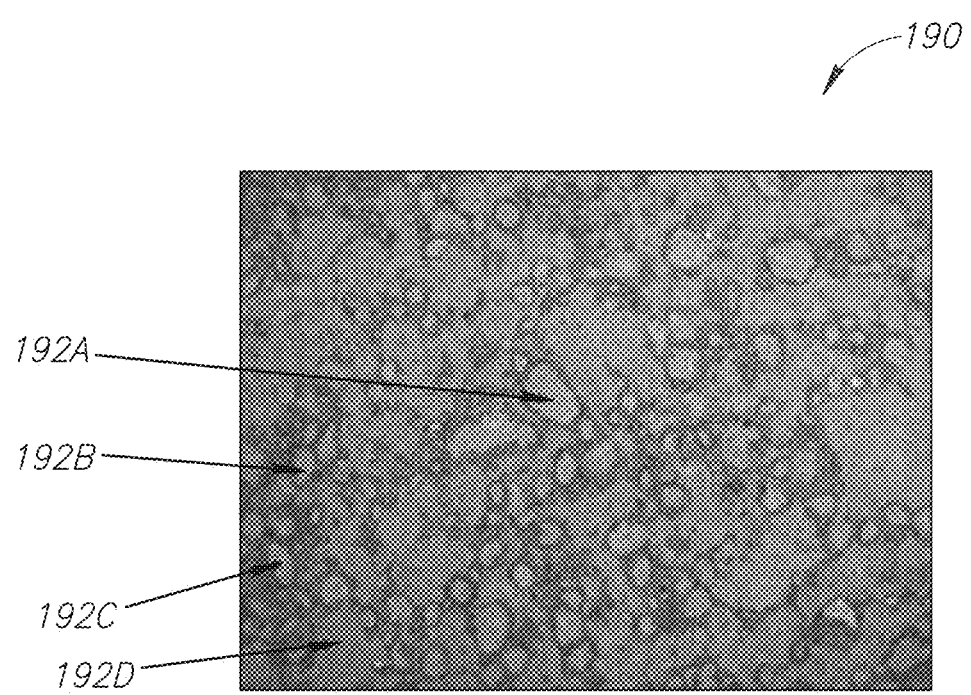

As shown in FIG. 3J, an artificial marble slab, such as 190, may exhibit a pattern that may be created by lumps, such as, for example, lumps 192A-D. Lumps, such as 192A-D may be substantially circular (round) lumps that may comprise essentially most of the area of the artificial marble slab. The lumps may further include one or more colorants that may be dispersed in various layers of the lump.

According to some embodiments, lumps (nuggets) of composite material may be prepared and may further be used for the manufacturing of artificial marble and artificial marble slabs. The lumps of composite material may be comprised of various compositions of such materials as inorganic particulate component (such as silicon, basalt, glass, diamond, rocks, pebbles, shells, a variety of quartz containing materials, and the like), polymers, binders, mixtures, resins, colorants, dyes, pigments, and the like, or any combination thereof.

In some embodiments, the lumps of composite materials may assume any three-dimensional shape, such as for example, squared shape, rounded shape, spiked shape, amorphous and the like, and may further be prepared at any size. The lumps of composite material may further exhibit any surface type, such as a smooth surface, uneven surface, rigid surface, and the like. The lumps of composite stone material may include one or more layers, wherein the layers may have different properties. The lumps of composite material may further be used for the preparation of artificial marble that may exhibit various patterns that may be formed by the lumps of composite material.

In some embodiments, there is provided a method for the preparation of an engineered stone slab having coated lumps of composite stone material, the method includes scooping a first inorganic particulate material and a polymer material to produce lumps of composite stone material and mixing a second inorganic particulate material with the lumps to produce coated lumps. The scooping, the mixing or both may be performed in a mixer having a mixing hook which comprises an extension. The extension may include a flat surface, two interconnected surfaces, a spoon-shaped surface or any combination thereof. The first inorganic particulate material, the second inorganic particulate material, or both, may include quartz.

In some embodiments, the method for the preparation of an engineered stone slab having coated lumps of composite stone material may further include adding one or more colorants to the first inorganic particulate material, the second inorganic particulate material or to both.

In some embodiments, the coated lumps may include an inner core having a first property and an outer layer having a second property. The property may include such properties as, color, texture, density, opacity, transparency, chemical composition, hardness, porousivity or any combination thereof. The shape of the lumps may substantially round, substantially circular, spiked, or any combination thereof.

In some embodiments, the first inorganic particulate material may include particles having a size range of about 0.05 mm to about 5 mm. The second inorganic particulate material may include particles having a size range of about 35 micron to about 50 microns. The polymer may include a binder, hardener, initiator, or any combination thereof.

In some embodiments, the scooping may be performed at a varying mixing speed. The mixing may be performed at a varying mixing speed.

In some embodiments, the method for the preparation of an engineered stone slab having coated lumps of composite stone material may further include mixing a third inorganic particulate material with the coated lumps to produce multi-layer coated lumps.

In some embodiments, there is provided an engineered stone slab having coated lumps of composite stone material, wherein at least a portion of the coated lumps include an inner core having a first property and an outer layer having a second property. The property may include color, texture, density, chemical composition, hardness, porousivity or any combination thereof. The lumps may include composite stone material. The distribution of the lumps within the slab may be uniform, non-uniform or both. The size of the lumps may be uniform, non-uniform, or both. The shape of the lumps may substantially round, substantially circular, spiked, or any combination thereof.

In some embodiments, there is provided a method for the preparation of a composite stone material having over 65% in the form of lumps, the method including mixing inorganic quartz material, adding resin to the inorganic quartz material, and adding ground inorganic quartz material to the mixture of inorganic quartz material and resin, wherein the lumps are adapted to essentially retain the integrity thereof. The order of material mixing and/or addition may change, and may not necessarily be the above stated order; other suitable orders may be used. The composite stone material may have over 75% in the form of lumps. The composite stone material may have over 85% in the form of lumps.

In some embodiments, there is provided a method for the preparation of a composite stone material, at least a portion of the material having a form of lumps, the method including mixing inorganic quartz material, resin, ground inorganic quartz material, wherein the mixing is performed by a mixer having mixing blade(s) which include an extended mixing surface such as a spatula or a flat surface, a curved surface, two interconnected surfaces, a spoon-shaped surface, or any combination thereof. The lumps are adapted to essentially retain the integrity thereof.

In some embodiments, there is provided a method for the preparation of lumps of composite stone material that may include mixing inorganic quartz material and one or more of the following: colorant, resin, grounded inorganic quartz material, or any combination thereof; and wherein said mixing may be performed at a predetermined speed, such as in the range of 1-15 m/sec.

In some embodiments, the inorganic quartz material that may be in the method for the preparation of lumps of composite stone material may include sand of various particle sizes, such as in the range of about 0.05 mm to 10 mm. The inorganic quartz material may further include ground sand of a particle size in the range of about 1 micron to 65 microns. The particle size may include, for example, the largest diameter of the particle, the longest dimension of the particle, and the like. The inorganic quartz material may further include any other natural and/or artificial material that may contain inorganic quartz, such as, for example, basalt, glass, diamond, rocks, pebbles, shells, silicon, or any combination thereof.

In some embodiments, the colorant may include any dye, pigment, colorant and any combination thereof. The resin may include polymer (such as polyester), binder (such as silane), hardener, initiator, and the like, or any combination thereof.

In some embodiments, the lumps of composite material may include any form, such as, for example, substantially round lumps, substantially circular, spiked, or any combination thereof.

In some embodiments, the lumps formed in the mixer may subsequently be coated in a separate step, in which one or more colorant(s) are added, for example, in liquid or powder form, in order to coat the individual lumps and blobs. For example, colorant(s) may be added into a rotating drum in which the lumps or blobs are coated. In some embodiments, the colorant coating drum may be utilized at one or more various locations along the process. Other suitable operations may be used in order to add colorant(s) and/or to coat the lumps or blobs.

In some embodiments, the method for preparation of lumps of composite stone material may further include mixing at a predetermined speed, such as in the range of, for example, 1 to 15 m/sec. The mixing may be performed in a mixer or a drum mixer that may further include a modified mixing blade or modified mixing drum, respectively.

In some embodiments, there is provided an artificial marble slabs comprising lumps of composite stone materials, wherein at least a portion of the lumps include at least one colored coating layer. In another embodiment, at least a portion of the lumps includes two or more colored coating layers, wherein each layer may be colored by a different colorant or a similar colorant at different dosages and/or concentrations. According to some embodiments, there is provided an artificial marble slab comprising lumps of composite stone materials, wherein at least a portion of the lumps include at least one colored coating layer, wherein the resulting slab has a veined effect.

In some embodiments, there is provided an artificial marble slab comprising over 65% lumps of composite stone materials. According to some embodiments, there is provided an artificial marble slab comprising over 75% lumps of composite stone materials. According to some embodiments, there is provided an artificial marble slab comprising over 85% lumps of composite stone materials. According to some embodiments, there is provided an artificial marble slab comprising over 95% lumps of composite stone materials.

According to some embodiments, lumps (nuggets) or blobs of composite material may be prepared and may further be used for the manufacturing of artificial marble and artificial marble slabs. The lumps or blobs of composite material may be comprised of various compositions of such materials as inorganic particulate component (such as silicon, basalt, glass, diamond, rocks, pebbles, shells, a variety of quartz containing materials, and the like), polymers, binders, mixtures, resins, colorants, dyes, pigments, and the like, or any combination thereof. The lumps or blobs of composite materials may assume any three-dimensional shape, such as for example, squared shape, rounded shape, spiked shape, amorphous, or the like, and may further be prepared at any size. The lumps or blobs of composite material may further exhibit any surface type, such as a smooth surface, uneven surface, rigid surface, and the like. The lumps or blobs of composite stone material may include one or more layers, wherein the layers may have different properties. The lumps or blobs of composite material may further be used for the preparation of artificial marble that may exhibit various patterns that may be formed by the lumps or blobs of composite material.

According to some embodiments, there is provided a method for the preparation of an engineered stone slab having coated lumps or blobs of composite stone material, the method may include scooping a first inorganic particulate material and a polymer material to produce lumps of composite inorganic (e.g. stone) material and mixing a second inorganic particulate material with the lumps or blobs to produce coated lumps or blobs. The scooping, the mixing or both may be performed in a mixer having a mixing hook which comprises an extension. The extension may include a flat surface, two interconnected surfaces, a spoon-shaped surface or any combination thereof. The first inorganic particulate material, the second inorganic particulate material, or both, may include quartz.

According to some embodiments, the lumps or blobs may be formed in a rotating (drum) mixer. Composite/particulate material(s) and polymers/binders may be introduced into the mixer, for example, in batches or substantially continuously. According to further embodiments, one or more colorants may be added to a first particulate material and/or to a second inorganic particulate material.

In some embodiments, as the mixer rotates, the composite and/or particulate materials, colorants and polymers and/or binds may mix, and may form lumps or blobs. As a lump or blob continues to roll around in the mixer, it may gather or accumulate additional material, and may grow in size, similar to a "snowball effect".

In some embodiments, lumps or blobs may be selectively removed from the mixer, for example, in batches, once a sufficient number of lumps or blobs have reached a target size. In some embodiments, individual lumps or blobs may be selectively removed, or substantially continuously removed, from the mixer. In some embodiments, the mixer may include, or may be operated in conjunction with, a lump selector able to identify or filter a lump or blob having a size larger than a threshold value; as well as a lump ejector able to eject such selected lumps or blobs.

In some embodiments, lumps of blobs may be selectively removed from the mixer using one or more methods or tools. In some embodiments, material(s) may be inserted into the mixer substantially continuously; and as new material(s) are added into the mixer, previously-mixed material(s), or lumps or blobs that are already formed in the mixer, exits the mixer, optionally through a funnel, a cone, a channel, an opening, a cone-shaped tool, a shaft, an opening, or other mechanism which may be located at one or more suitable areas (or at an end) of the mixer. The mixer may have a particular shape, for example, square, rectangular, diamond shape, circular, oval, egg shape, triangle, or the like.

In some embodiments, partial control or substantially complete control of the size (or other properties) of the lumps or blobs which exit the mixer, may be achieved by setting and/or modifying one or more parameters, for example: the rate of new material(s) entering the mixer; the rate of spinning of the mixer (e.g., rounds per minute); the spinning angle of the mixer; or other suitable parameters. In some embodiments, setting and/or modification of such parameter(s) may be used to control the maximum size, or the average size, of lumps or blobs which exit the mixer; but may not necessarily also control the minimal size of lumps or blobs which exit the mixer.

In some embodiments, for example, the mixed material(s) which include lumps or blobs, may undergo a separation process, a sieving process, a filtering process, a sifting process, a straining process, a sorting process, and/or other suitable processes in order to distinguish among lumps or blobs based on their size, or in order to ensure that lumps and blobs that are smaller than a threshold value do not exit the mixer, or exit the mixer through a different opening from the opening that allows the bigger lumps or blobs to exit the mixer. In some embodiments, the mixed material(s), which may include blobs or lumps of various sizes, may be transferred onto a horizontal conveyor belt or a diagonal or angled conveyor belt, in which the bottom of the conveyor belt has multiple slits or openings or slots allowing gradual or multi-step separation of lumps or blobs based on size.

In some embodiments, for example, a first stage of slits allows separation of a first size of lumps or blobs; a second, different, stage of slits may have different size and/or different shape, and may allow separation of lumps or blobs having a second, different, size, which may be greater or smaller than the first size. In some embodiments, the exit of the slits or other separation points may further be connected to additional conveyor belts, for transferring of the material(s) or blobs or lumps into suitable bucket or storage containers. In some embodiments, the sifting may be performed substantially vertically, such that blobs or lumps having a particular size remain "stuck" in the upper area of the filtering mechanism, whereas smaller lumps or blobs path through and concentrate at the bottom size gets stuck until the smallest are left at the bottom area of the filtering mechanism. Other sorting mechanisms may be used.

In some embodiments, the mixer may be constructed or adapted to force out, or to push out or otherwise remove, lumps or blobs which have reached a particular size (e.g., a minimum threshold size), out of an opening of the mixer. Some embodiments may utilize a substantially continuous material feed and substantially continuous lump or blob ejection by the mixer; and therefore, the process may run substantially continuously. In some embodiments, the mixer may include, or may be operated in conjunction with, a lump selector able to continuously identify or filter a lump or blob having a size larger than a threshold value; as well as a lump ejector able to continuously eject such selected lumps or blobs.

In some embodiments, lumps or blobs may be coated or dusted with a particulate material composition, which may be similar to or may be different from the composition used to form the lump or blob. For example, the coated or dusted material may form a layer on an outer surface of the lump or blob; and thus, the outer layer may have an appearance which may be similar to or different from the appearance of the other areas (e.g., the inner region) of the lump or blob. In some embodiments, substantially any material which may be usable or suitable to form a lump or blob, may also be usable or suitable to form the outer coated or dusted layer of the lump or blob.

In some embodiments, the coated lumps may include an inner core having a first property (or a first value of a particular property), and an outer layer having a second property (or a second value of the same particular property). The property may include such properties as, for example, color, texture, density, chemical composition, hardness, porousivity or any combination thereof. The shape of the lumps may be substantially round, substantially circular, spiked, or any combination thereof.

In some embodiments, the first inorganic particulate material may include particles having a size range of about 0.05 mm to about 5 mm. The second inorganic particulate material may include particles having a size range of about 35 micron to about 50 microns. The polymer may include a binder, hardener, initiator, or any combination thereof.

In some embodiments, scooping may be performed at a varying mixing speed. The mixing may be performed at a varying mixing speed.

In some embodiments, the method for the preparation of an engineered stone slab having coated lumps/blobs of composite (e.g., stone particulate) material may further include mixing a third inorganic particulate material with the coated lumps to produce multi-layer coated lumps.

In some embodiments, slabs of material (e.g., slabs of artificial stone or artificial marble) may be manufactured or formed using a multi-stage process utilizing the coated or dusted lumps or blobs.

Figure 4:
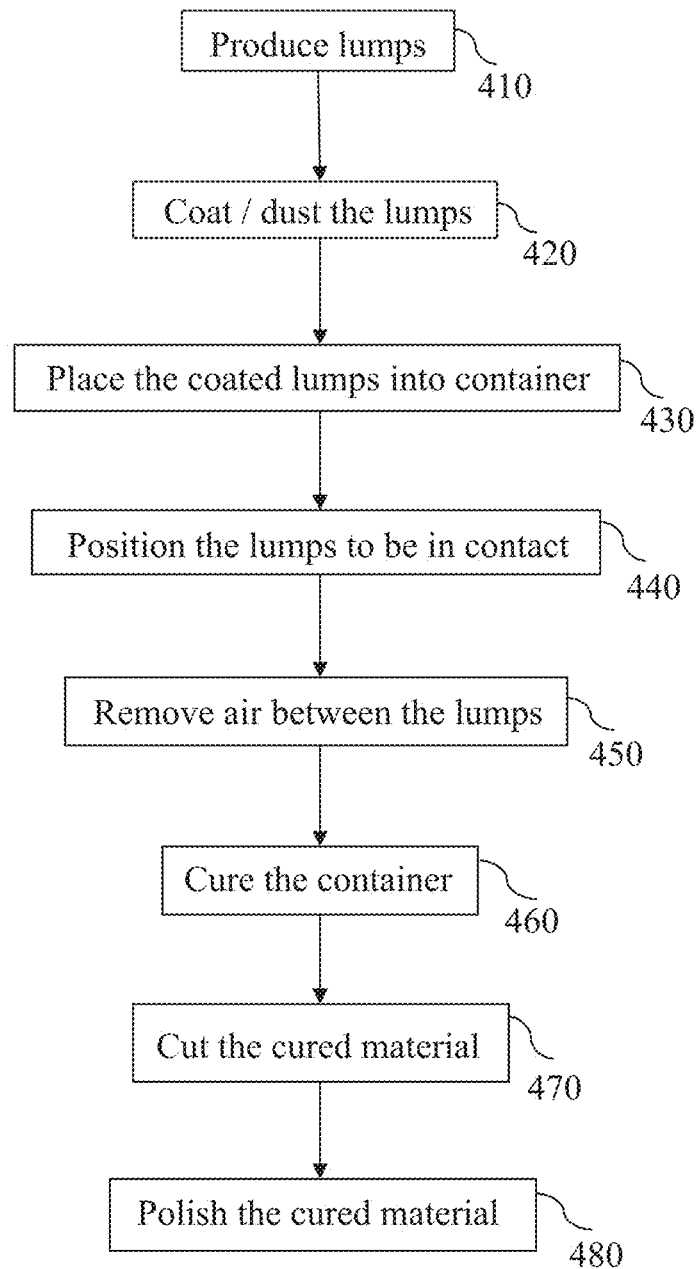
FIG. 4 is a schematic flow-chart of a method of producing a slab of material, in accordance with some demonstrative embodiments.

Reference is made to FIG. 4, which is a schematic flowchart of a method of producing a slab of material, in accordance with some demonstrative embodiments. The method may include, for example, producing lumps or blobs (block 410); coating or dusting the lumps or blobs (block 420); placing the coated or dusted lumps or blobs into a container (block 430); allowing the lumps or blobs to settle substantially completely in contact with one another (block 440) (e.g., and not only with a binder material or a filler material); removing substantially all air in between the lumps or blobs (block 450) (for example, using a press, a roller, a compressing unit, a pushing unit, or the like); and curing the container of lumps or blobs (block 460). Optionally, additional steps of cutting the cured material (block 470) and/or polishing the cured material (block 480) may be performed, in order to result in formed artificial stone slabs.

In some embodiments, the operations of block 430 may be transitional, optional, and/or may be skipped. In some embodiments, transfer of lumps or blobs from the mixer to a subsequent unit or machine may be performed using baskets, conveyor belts, bowls, containers, manually, or using other methods.

In some embodiments, and in particular in block 440, lumps or blobs may be transferred into a spreading unit or a spreading machine, which may spreads the lumps or blobs substantially uniformly in a plate, dish, tray, platter, frame, open container, closed container, or the like. In some embodiments, the lumps and blobs are placed inside a dish or tray, similar to a large baking pan or baking tin; or inside a frame, optionally having particular material(s) at its bottom area, e.g., carton, fabric, plastic, paper, metal, or the like. In some embodiments, the dish or tray or frame may be open; in other embodiments, it may be partially closed, or substantially entirely closed, for example, using a lid, a cover, a metal element or cover, fabric, paper, plastic, or the like. In other embodiments, lumps or blobs may be spread manually, or with manual assistance to the spreading machine; or using a robotic arm or a robot imitating a manual spreading movement or automatically performing other spreading operations.

In some embodiments, the spreading machine may include one or more filters, spoons, wings, external wings, internal wings, arms, internal arms, external arms, robotic arms, machine-operated arms or wings, or other suitable elements to perform or facilitate the spreading. In some embodiments, the spreading results may be set and/or modified by setting and/or modifying one or more operational parameters or structural parameters of the spreading machine, for example, size, shape (e.g., square, rectangle, circular, oval), diameter (if circular), pace at which wings or arms move or rotate, type of motion (e.g., horizontal, vertical, diagonal, circular, oval-shaped, egg-shaped, shaking movement, back-and-forth movement, jumping movement, pendulum movement, vibrating movement, continuous movement, movements that are separated with time gaps or non-movement periods, movement which periodically stops and resumes), and/or other parameters.

In some embodiments, one or more other operations may optionally be used, before or during or subsequent to the operations described above. In some embodiments, lumps or blobs may be stabilized, before or during or after their removal from the mixer, using an additional layer of suitable material(s), for example, sand, fine sand, colored sand or fine sand, non-colored sand or fine sand, or the like. In some embodiments, lumps or blobs may be stabilized using other methods, for example, cooling, heating, preheating, microwave preheating, or other methods. In some embodiments, stabilization of the lumps or blobs may be performed in order to avoid losing the form, or other properties, of lumps or blobs (e.g., large or small) during their transition from the mixer to a subsequent unit prior to their pressing.

In some embodiments, the slab or materials produced in this process is composed of, for example, at least 80 percent of lumps or blobs; at least 85 percent of lumps or blobs; at least 90 percent of lumps or blobs; at least 92 percent of lumps or blobs; at least 95 percent of lumps or blobs; at least 97 percent of lumps or blobs; at least 98 percent of lumps or blobs; at least 99 percent of lumps or blobs; or other suitable ratios or percentages values.

In some embodiments, one or more cycles, identical cycles, similar cycles, or different cycles, may be performed and/or combined in order to produce a single product. In some embodiments, optionally, multiple mixers may be used in parallel or in sequence, having similar to different sizes or shapes or other properties; different types of coloring or painting elements may be used; and other combinations may be performed. In some embodiments, mixing may be performed at a constant speed, at a varying speed, at a speed which gradually increases from low to high, at a speed which gradually decreases from high to low, at a fixed speed or at varying speeds which periodically stop and then resume, at random or pseudo-random speed(s) within a pre-defined range of allowed speeds, or the like.

In some embodiments, color adding may be done at one or more stages of the process, for example: before the mixer; while the material(s) enter the mixer; inside the mixer; while the material(s) exit the mixer; subsequent to the mixer. The coloring may utilize various types of coloring agents, pigment, pasta color, liquid color, particle-based color, spray, or other types. In some embodiments, portions of the resulting product may be colored, colorless, substantially clear, partially clear, transparent, semi-transparent, substantially transparent, see-through, partially see-through, having a single color or shade, having multiple colors or shades, or the like. In some embodiments, one or more other and/or additional materials may be added, for example, for aesthetic purposes, e.g., silicon, basalt, or other materials.

Other suitable operations or sets of operations may be used in accordance with some embodiments. Some operations or sets of operations may be repeated, for example, substantially continuously, for a pre-defined number of iterations, or until one or more conditions are met. In some embodiments, some operations may be performed in parallel, in sequence, or in other suitable orders of execution.

Figure 5A:
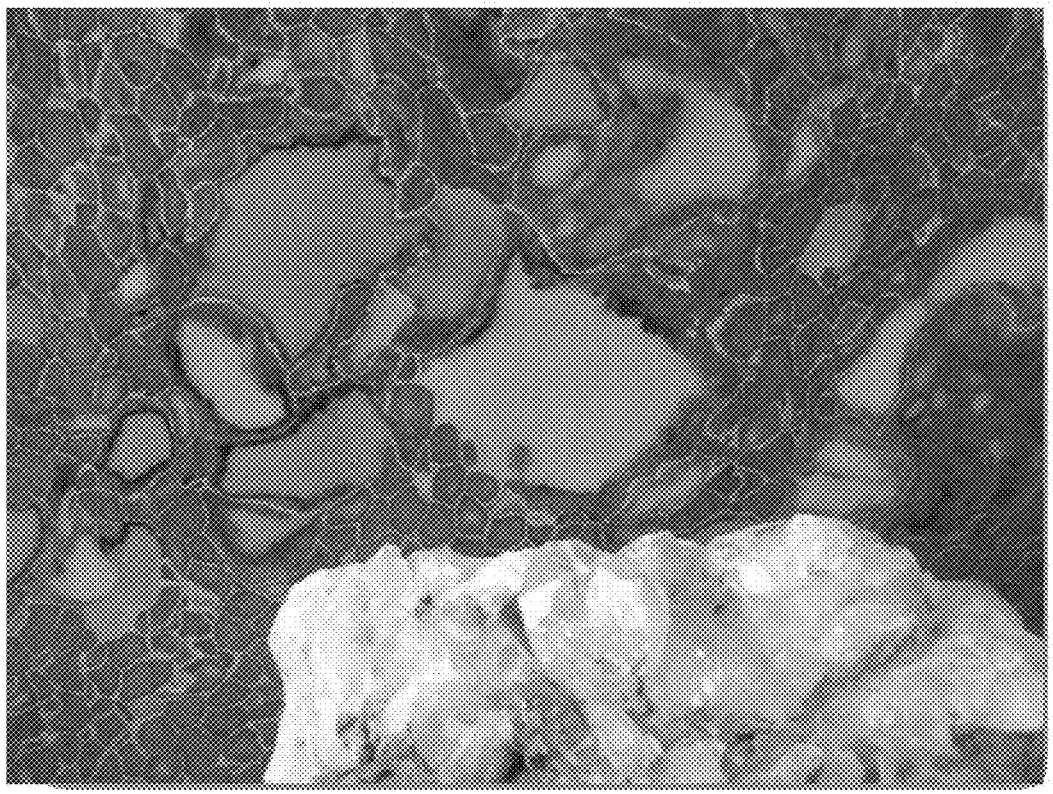
FIGS. 5A-5T are images of demonstrative artificial marble slabs, in accordance with some demonstrative embodiments.
Figure 5B:
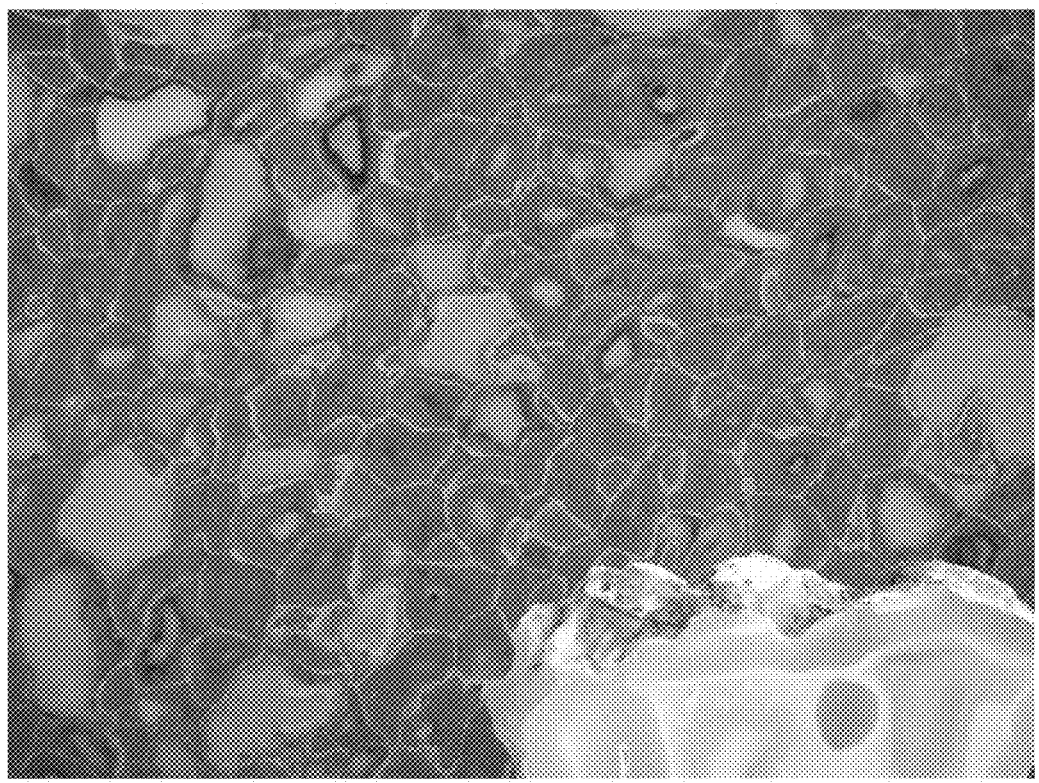
Figure 5C:
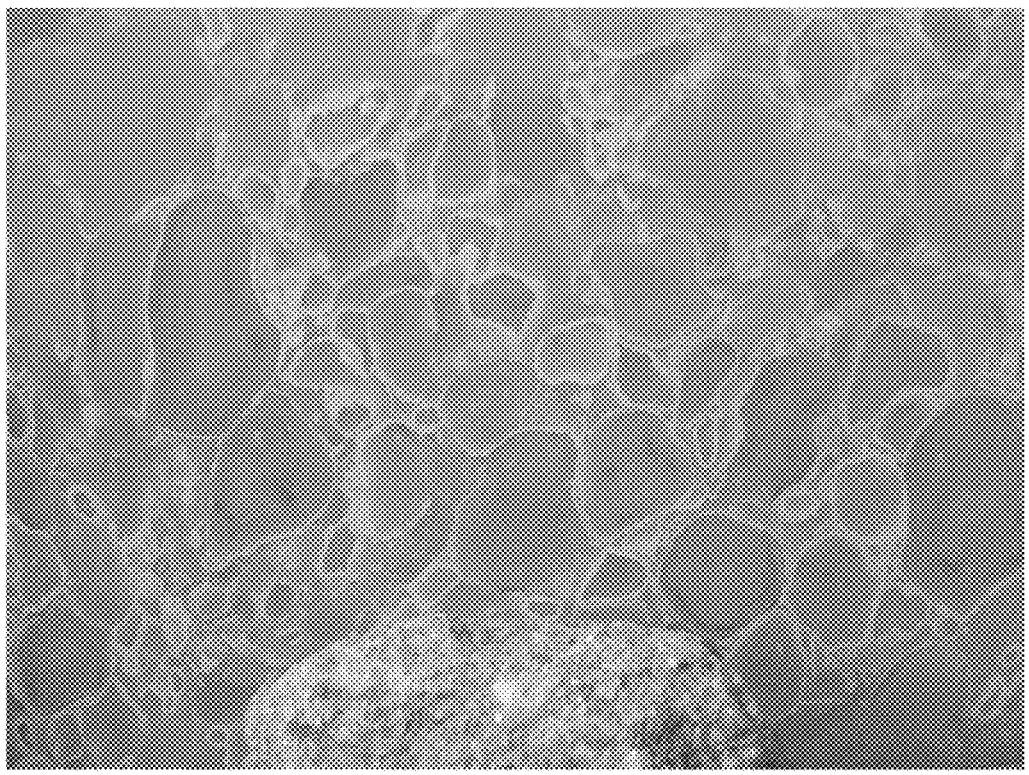
Figure 5D:
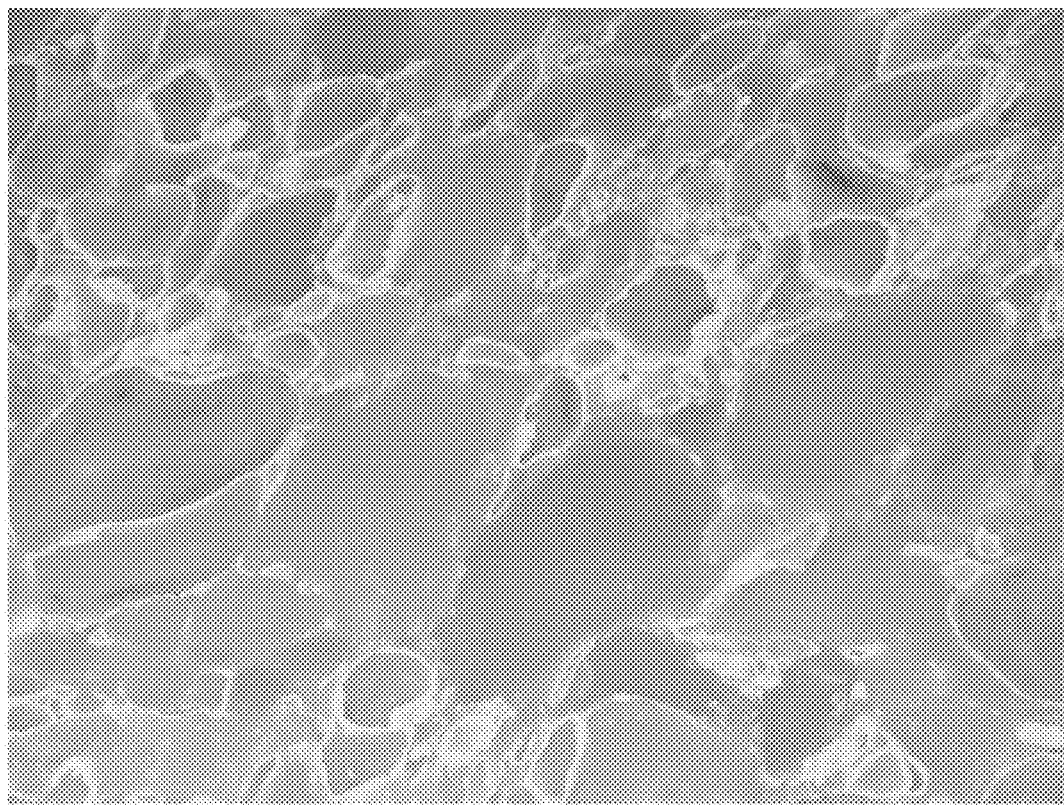
Figure 5E:
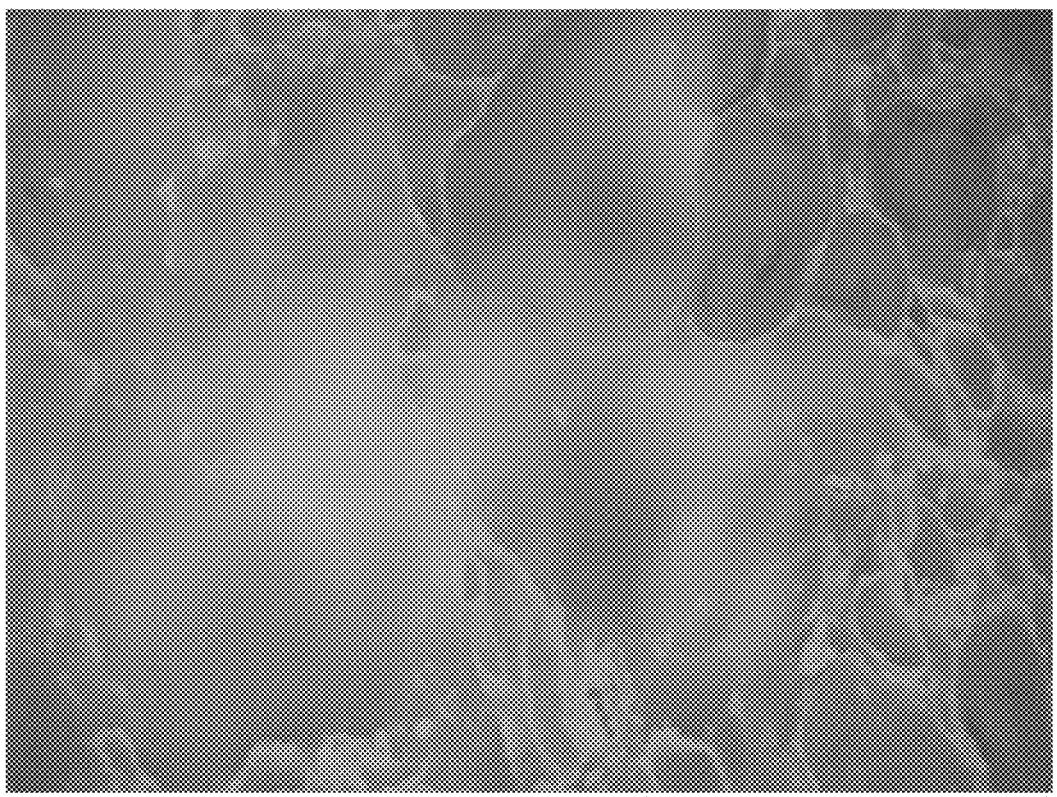
Figure 5F:
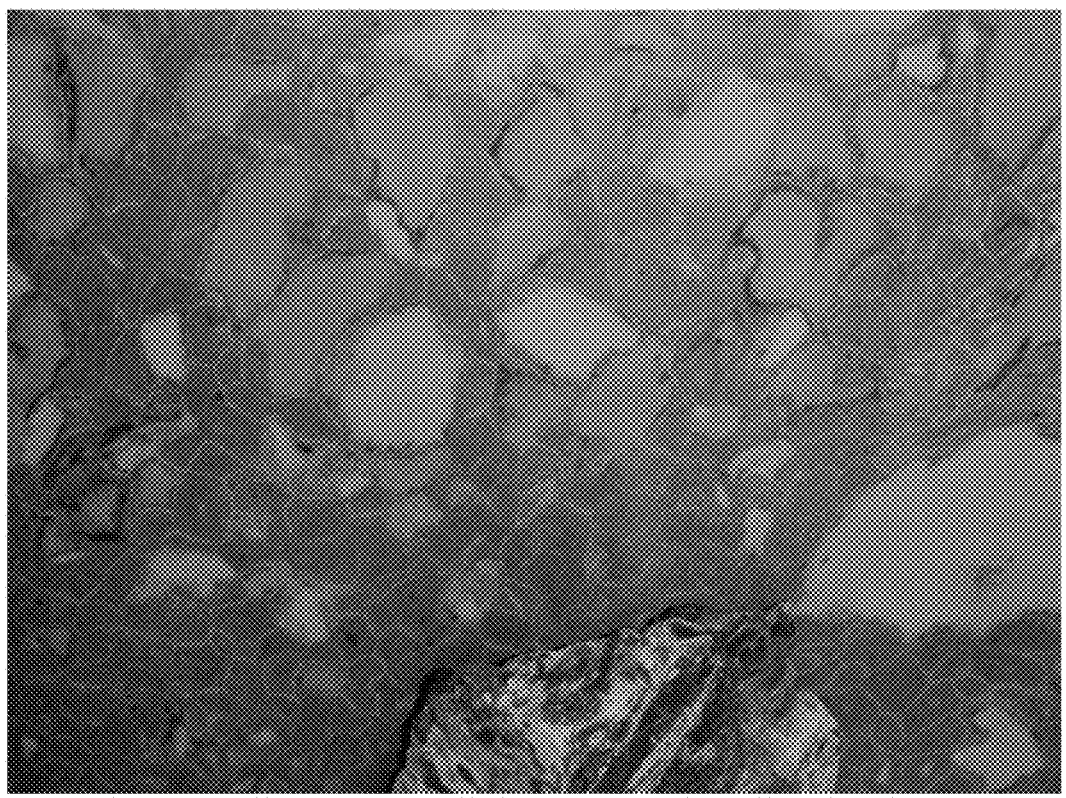
Figure 5G:
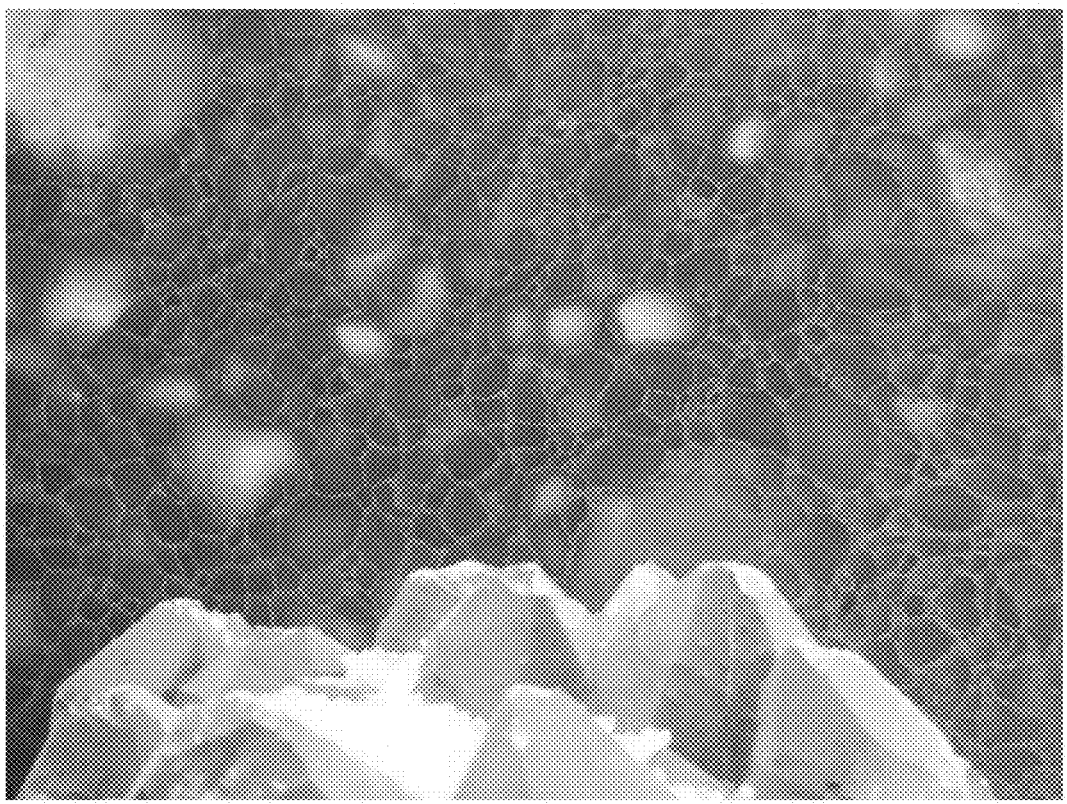
Figure 5H:
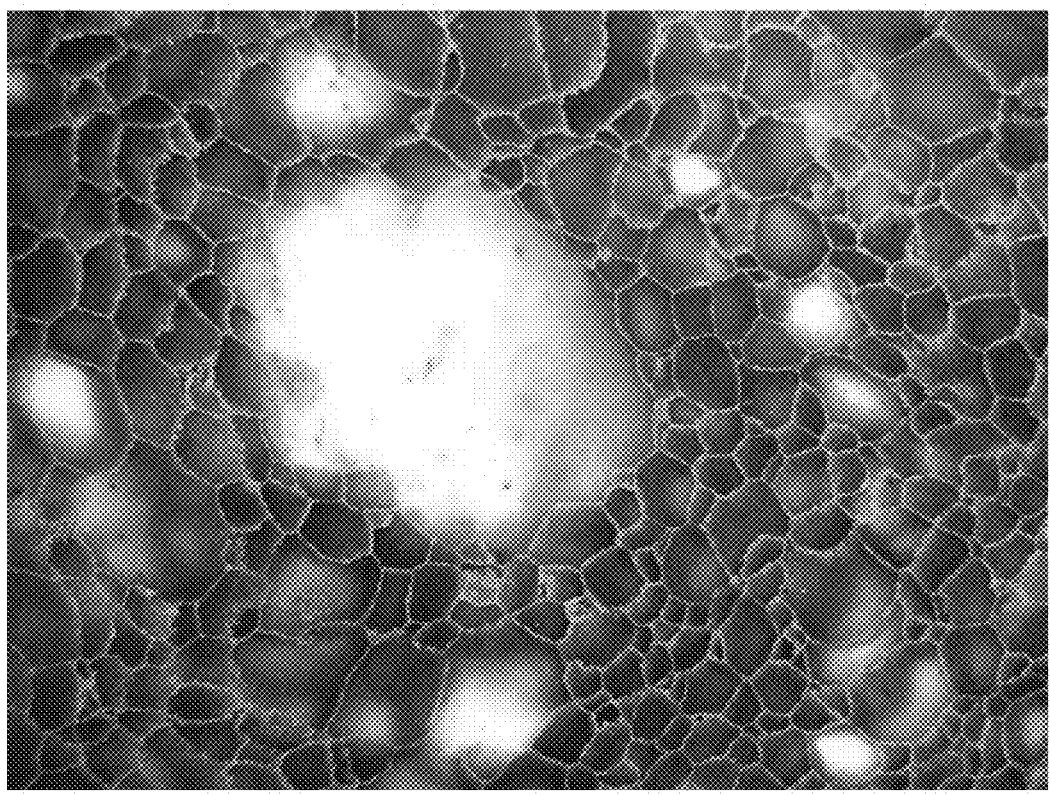
Figure 51:
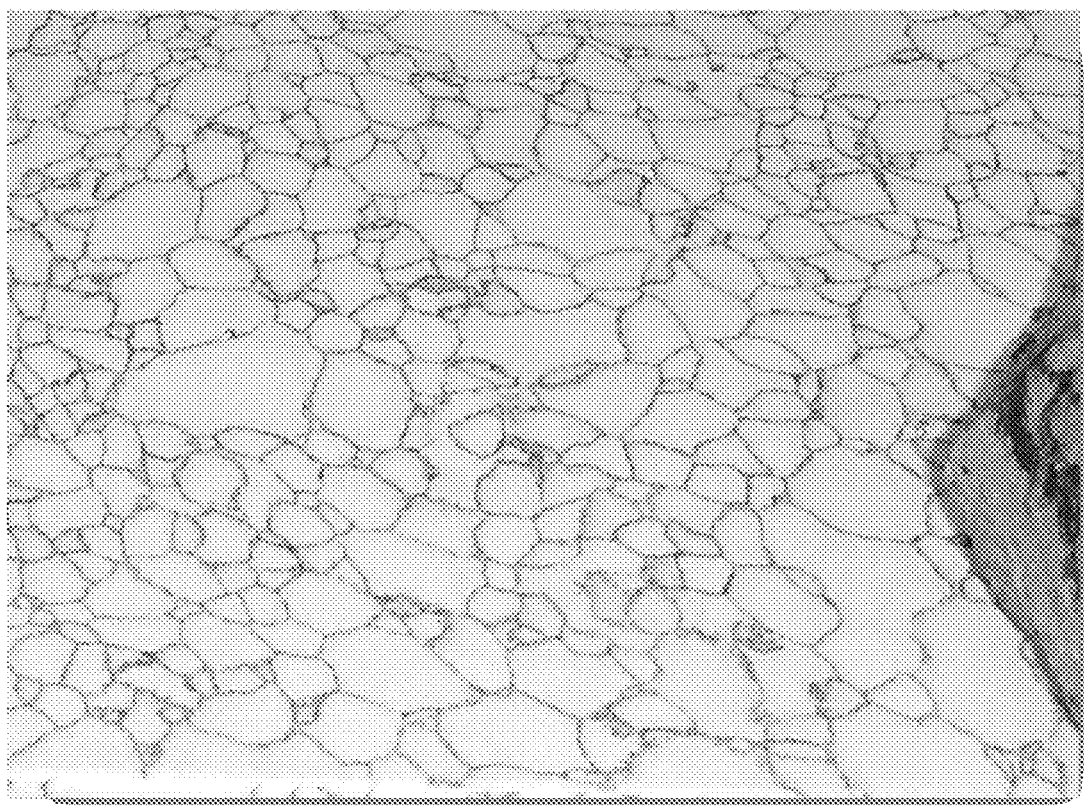
Figure 5J:
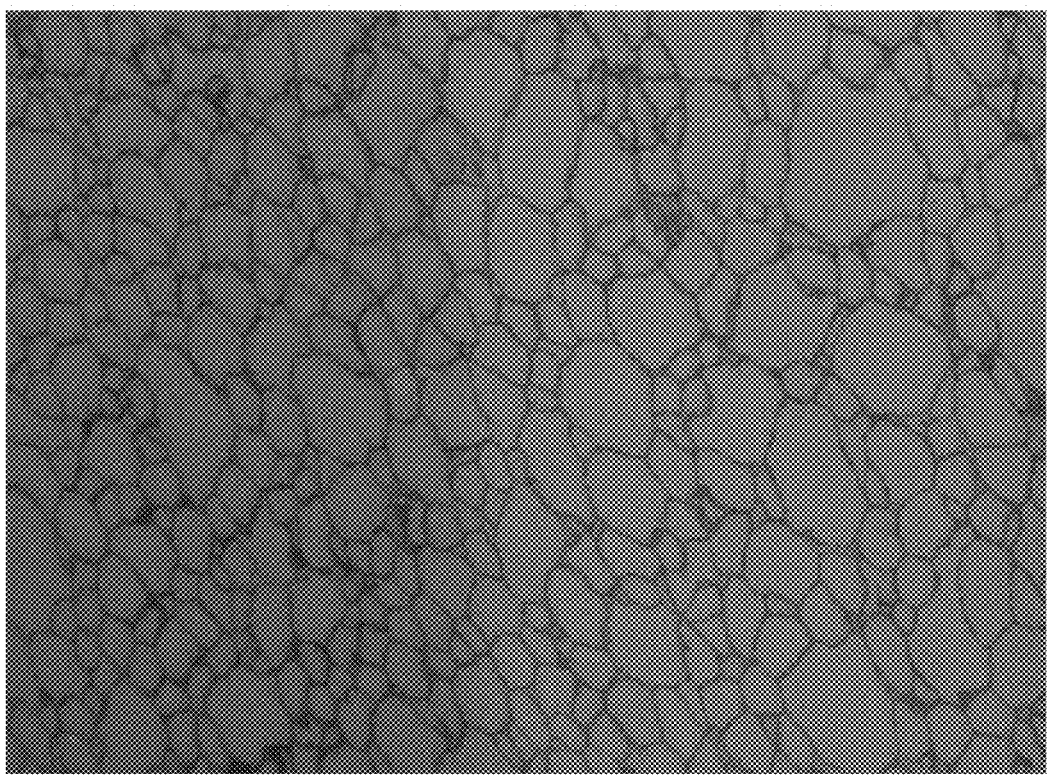
Figure 5K:
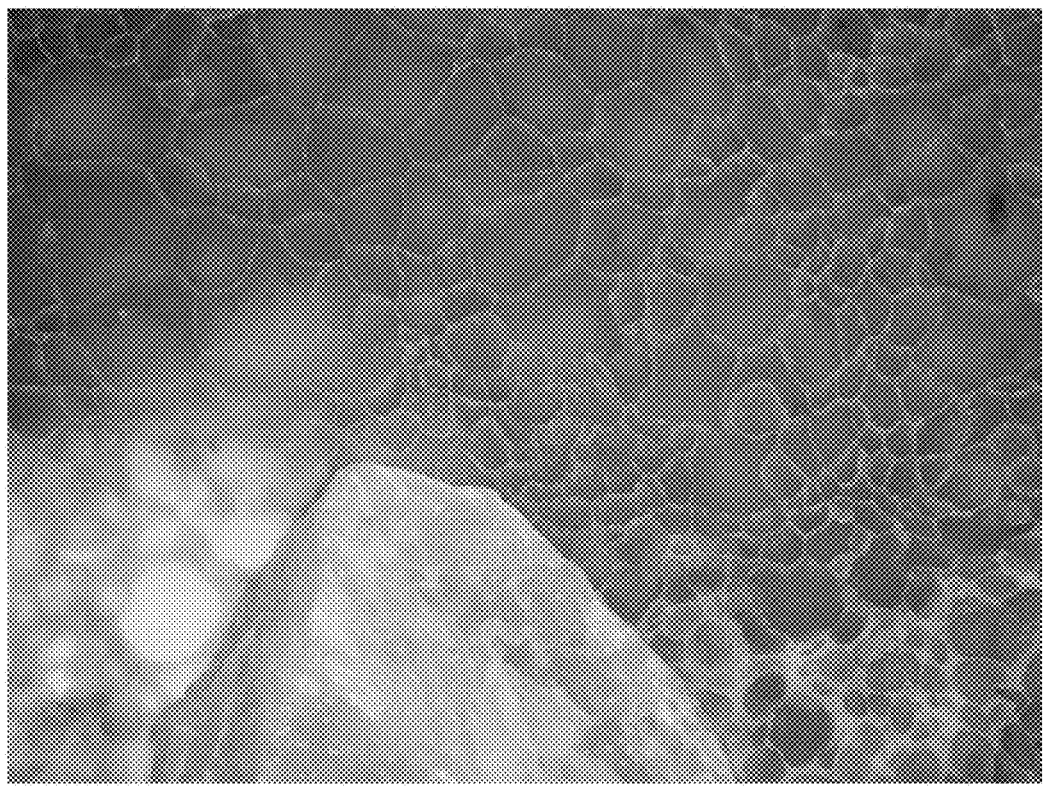
Figure 5L:
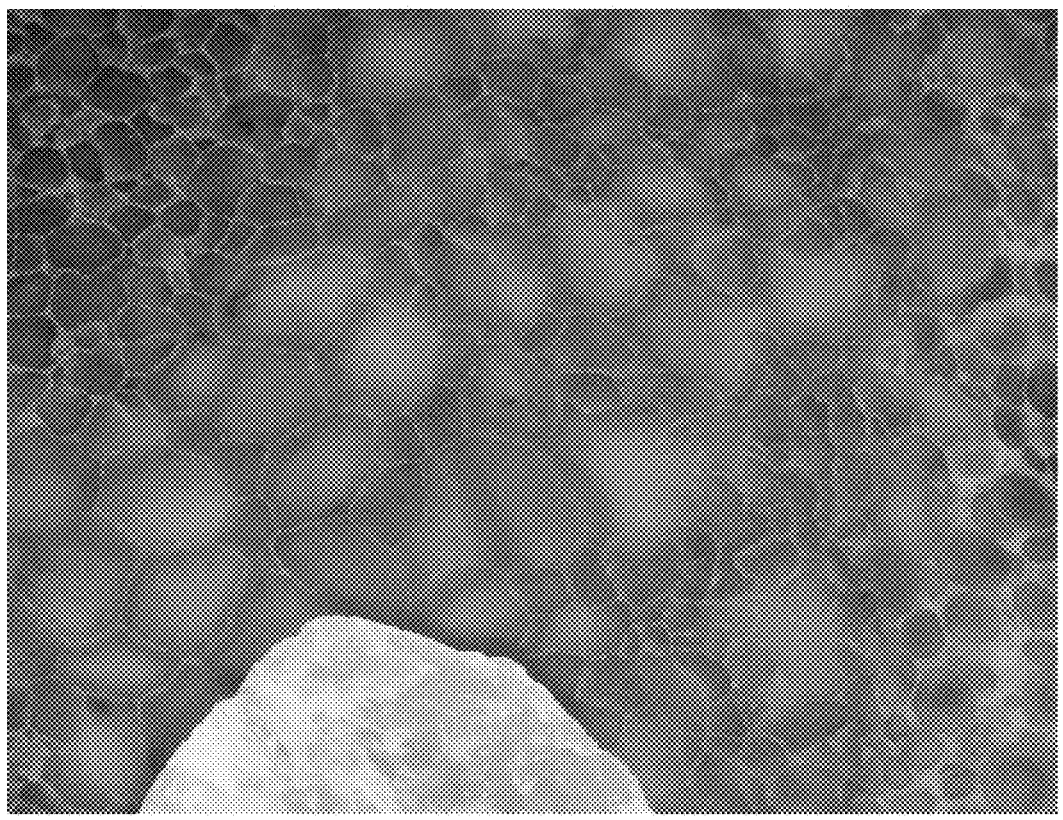
Figure 5M:
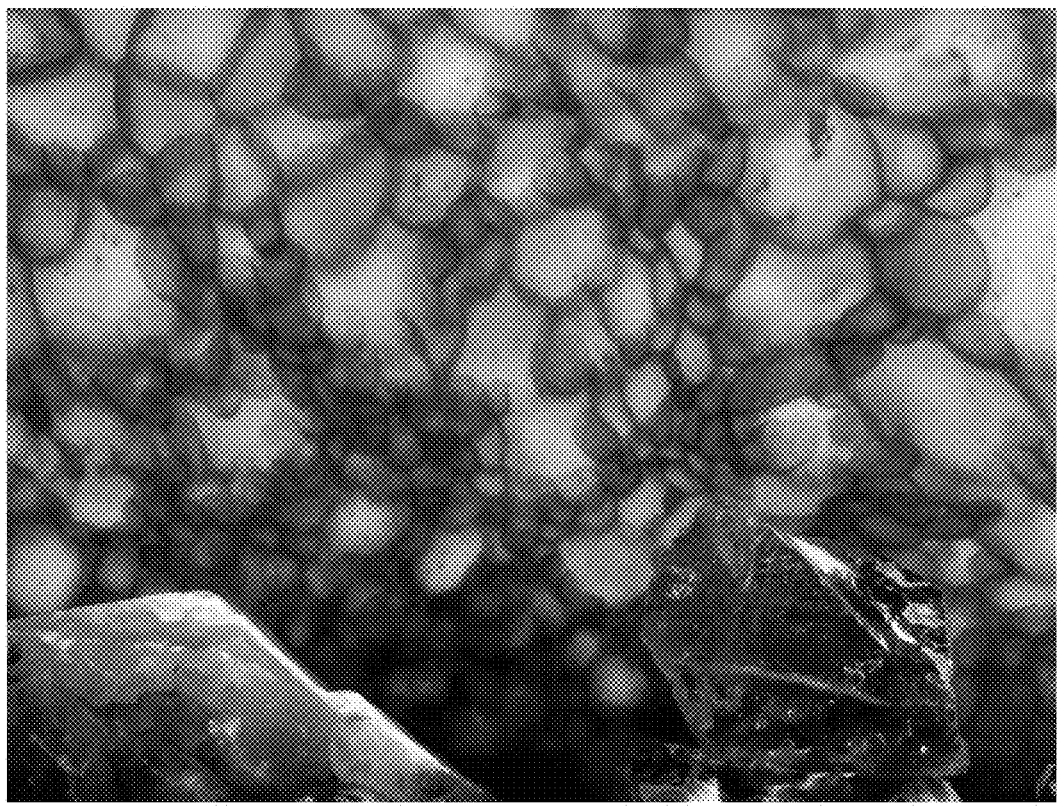
Figure 5N:
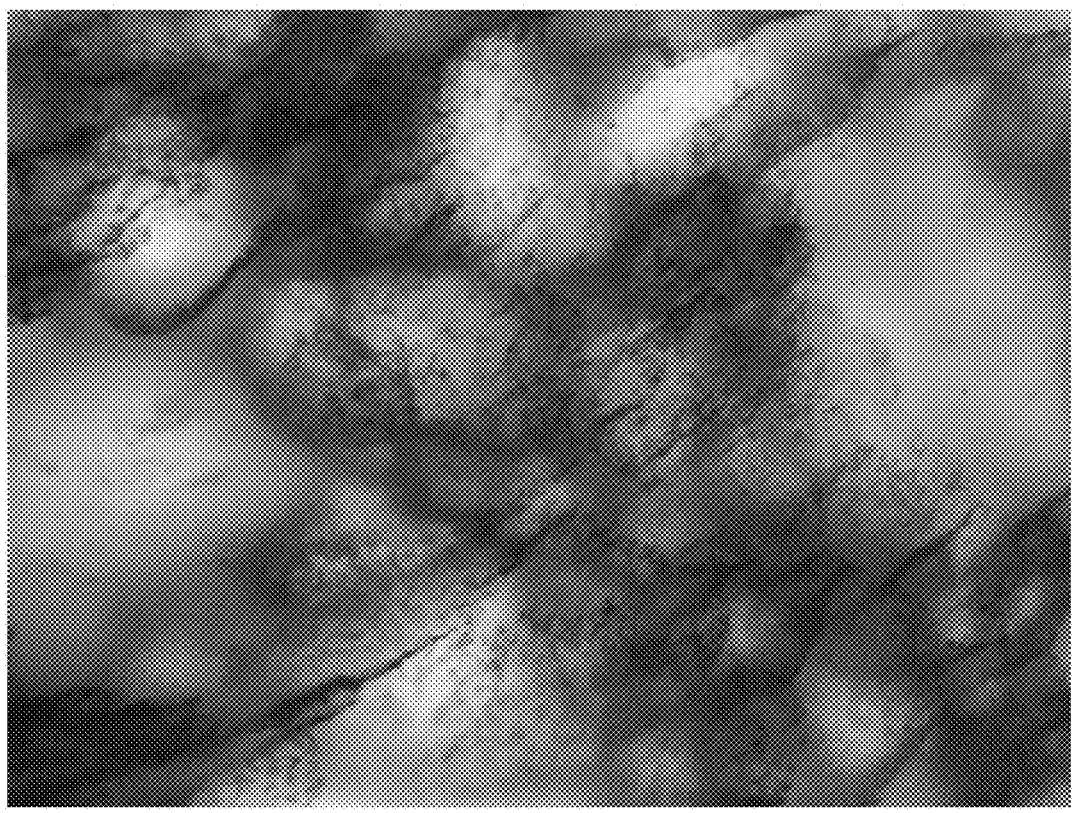
Figure 5P:
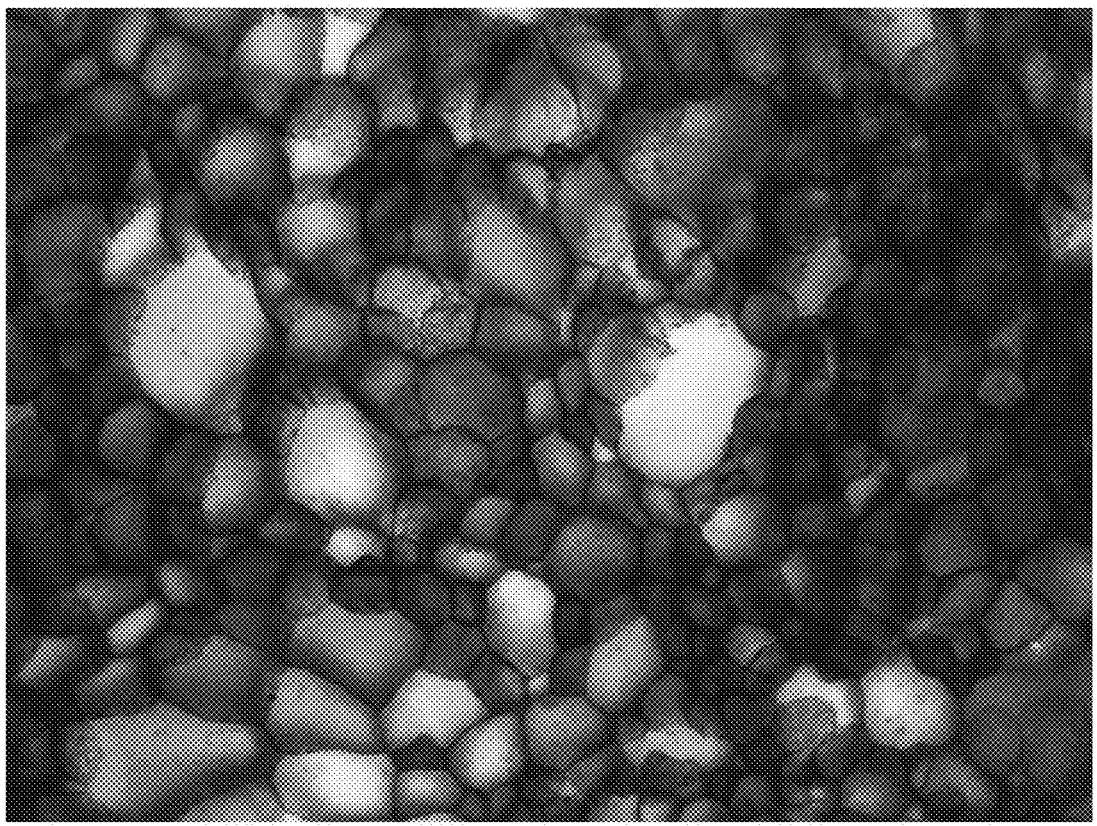
Figure 5Q:
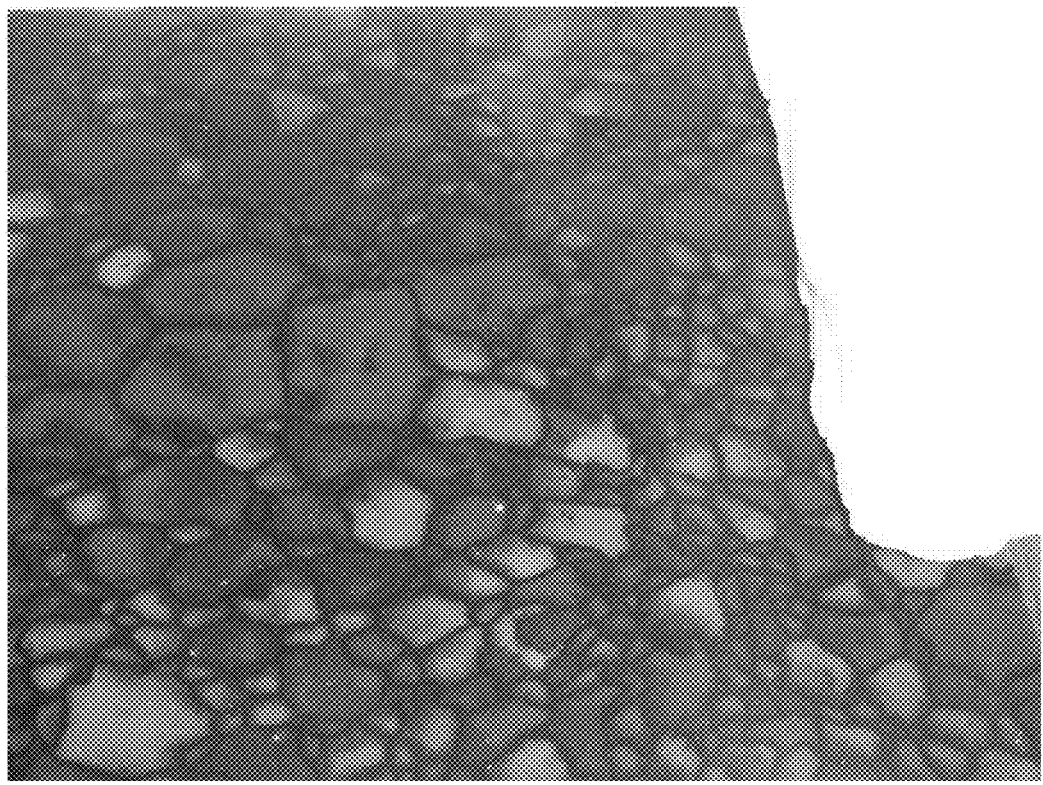
Figure 5R:
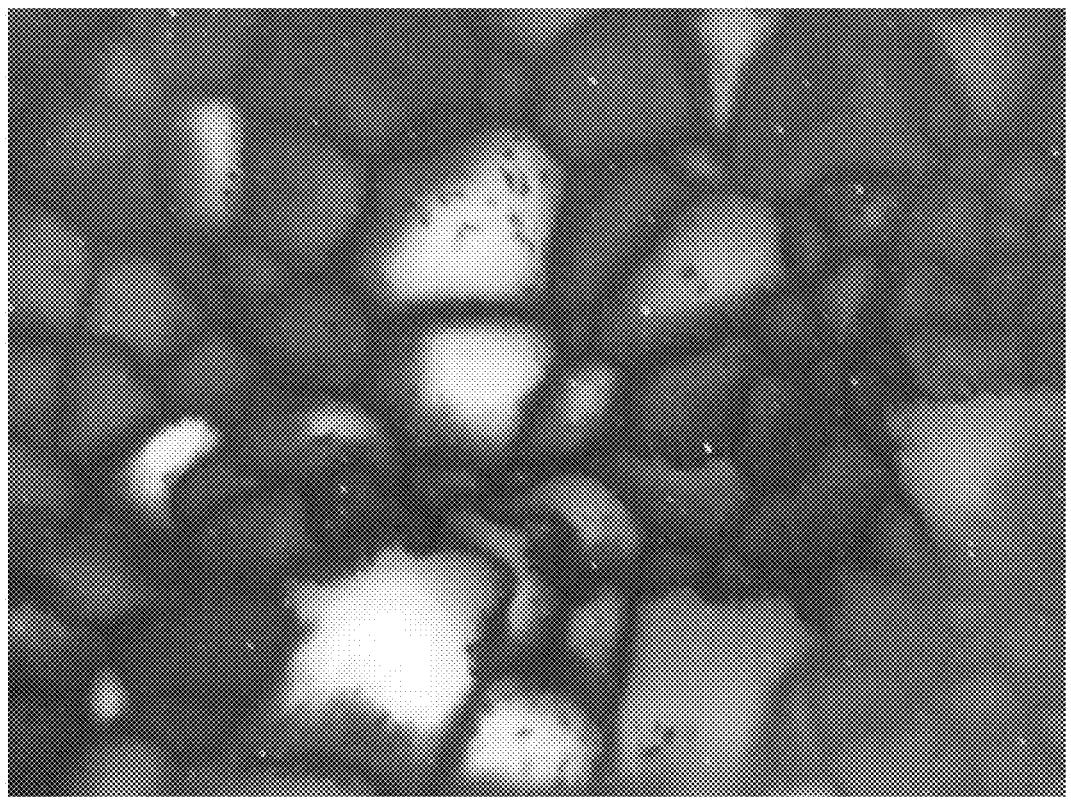
Figure 5S:
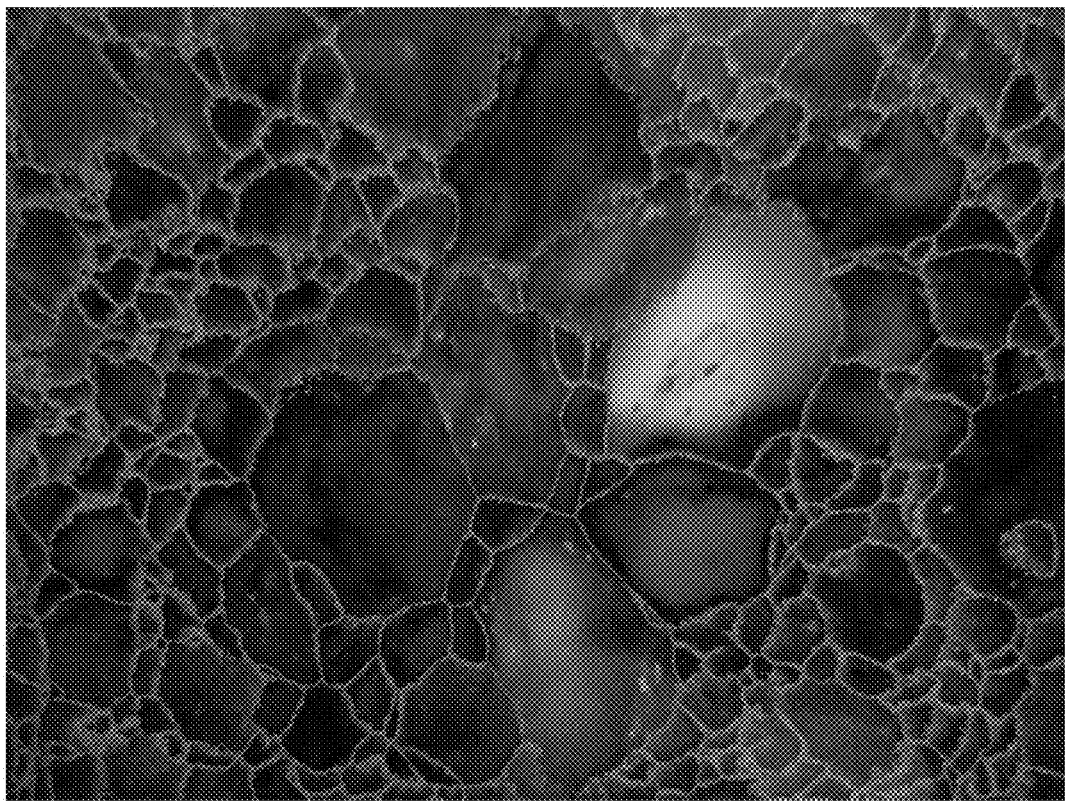
Figure 5T:
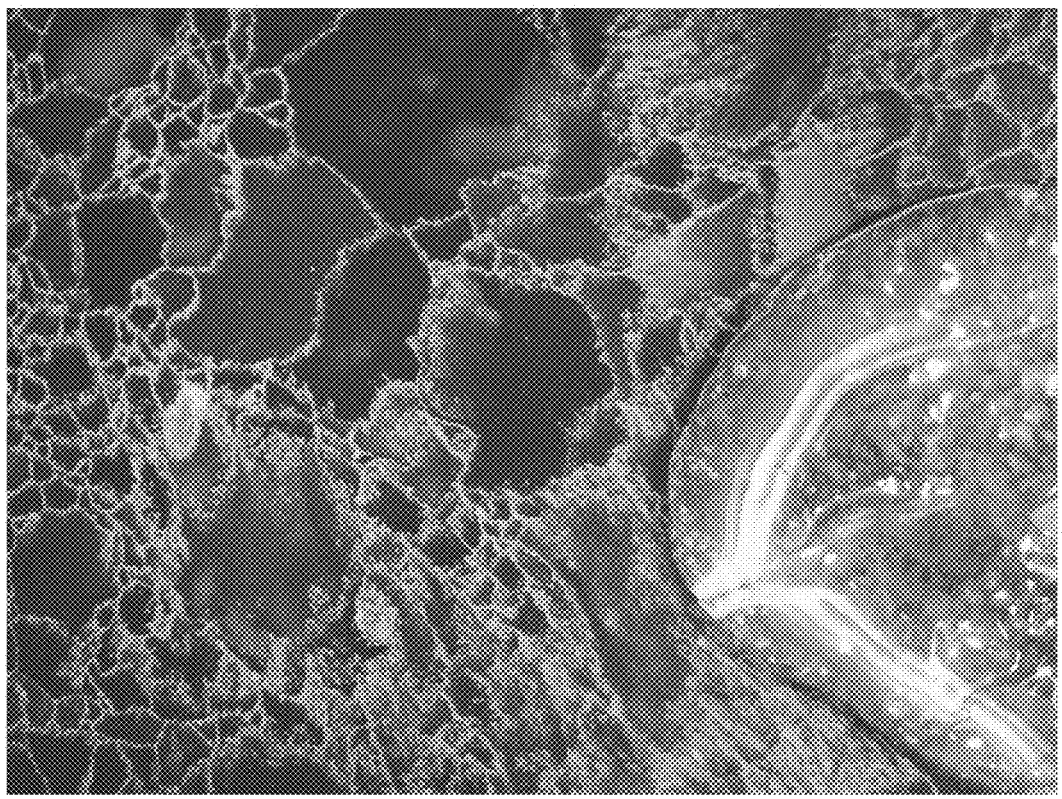

FIGS. 5A-5T are images of demonstrative artificial marble slabs, in accordance with some demonstrative embodiments. Other suitable shapes, patterns and textures may be produced in accordance with some embodiments; and other types of stone slabs, having similar or other types of lumps or blobs, may be produced in accordance with some embodiments.

The terms "plurality" or "a plurality" as used herein include, for example, "multiple" or "two or more". For example, "a plurality of items" includes two or more items.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some demonstrative embodiments have been illustrated and described herein, many modifications, substitutions, changes, and equivalents may occur to those skilled in the art. Accordingly, the following claims are intended to cover all such modifications, substitutions, changes, and equivalents.

What is claimed is:

1. An artificial stone slab comprising:
   a plurality of coated lumps of composite stone material, wherein at least a portion of the plurality of coated lumps are spaced apart by one or more fillers,
   wherein the coated lumps comprise an inner core and an outer layer,
   wherein a property of the inner core has a first value, and wherein the same property of the outer layer has a second, different, value.

2. The artificial stone slab of claim 1, wherein at least another portion of the coated lumps are in touch with each other.

3. The artificial stone slab of claim 1, wherein the one or more fillers comprise one or more organic polymers.

4. The artificial stone slab of claim 1, wherein the one or more fillers comprise non-agglomerated composite stone material.

5. The artificial stone slab of claim 1, wherein the one or more fillers comprise inorganic quartz matrix.

6. The artificial stone slab of claim 1, wherein the one or more fillers comprise one or more linkers.

7. The artificial stone slab of claim 1, wherein the one or more fillers comprise silane molecules.

8. The artificial stone slab of claim 1, wherein the plurality of coated lumps are non-uniformly distributed in the artificial stone slab.

9. The artificial stone slab of claim 1, wherein the property comprises a property selected from the group consisting of: color, texture, density, chemical composition, hardness, opacity, transparency, and porosity.

10. An engineered stone slab comprising:
    a plurality of coated lumps of composite stone material, wherein at least a portion of the coated lumps comprise an inner core having a first color and an outer layer having a second, different, color.

11. The engineered stone slab of claim 10, wherein the inner core comprises a first colorant, and wherein the outer layer comprises a second, different, colorant.

12. The engineered stone slab of claim 10, wherein the inner core comprises a colorant at a first concentration, and wherein the outer layer comprises said colorant at a second, different, concentration.

13. The engineered stone slab of claim 10, wherein the inner core comprises a colorant at a first dosage, and wherein the outer layer comprises said colorant at a second, different, dosage.

14. The engineered stone slab of claim 10, wherein the inner core has a first texture, and wherein the outer layer has a second, different, texture.

15. The engineered stone slab of claim 10, wherein the inner core has a first density, and wherein the outer layer has a second, different, density.

16. The engineered stone slab of claim 10, wherein the inner core has a first hardness value, and wherein the outer layer has a second, different, hardness value.

17. The engineered stone slab of claim 10, wherein the inner core has a first porosity value, and wherein the outer layer has a second, different, porosity value.

18. The engineered stone slab of claim 10, wherein the outer layer comprises a dusted layer.

19. The engineered stone slab of claim 10, wherein the outer layer comprises a layer formed by utilizing a liquid colorant.

* * * * *